United States Patent [19]
Ito et al.

[11] Patent Number: 6,024,560
[45] Date of Patent: Feb. 15, 2000

[54] INJECTION MOLDING MACHINE

[75] Inventors: Susumu Ito, Hino; Mitsushi Yoshioka, Oshino-mura, both of Japan

[73] Assignee: Fanuc Ltd., Yamanashi, Japan

[21] Appl. No.: 09/011,021

[22] PCT Filed: Jun. 19, 1996

[86] PCT No.: PCT/JP97/02111

§ 371 Date: Feb. 5, 1998

§ 102(e) Date: Feb. 5, 1998

[87] PCT Pub. No.: WO97/48539

PCT Pub. Date: Dec. 24, 1997

[30] Foreign Application Priority Data

Jun. 19, 1996 [JP] Japan .................................. 8-177229

[51] Int. Cl.[7] .................................................. B29C 45/64
[52] U.S. Cl. .......................................... 425/593; 425/594
[58] Field of Search .................................. 425/593, 594, 425/451.6

[56] References Cited

U.S. PATENT DOCUMENTS

| | | | |
|---|---|---|---|
| 3,292,214 | 12/1966 | Battenfeld et al. | 425/594 |
| 4,636,167 | 1/1987 | Shibata | 425/594 |
| 4,708,631 | 11/1987 | Hehl | 425/594 |
| 5,565,224 | 10/1996 | Stillhard | 425/593 |

FOREIGN PATENT DOCUMENTS

| | | |
|---|---|---|
| 5-337977 | 12/1993 | Japan . |
| 8-57896 | 3/1996 | Japan . |
| 194807 | 3/1938 | Switzerland ........................... 425/594 |

*Primary Examiner*—James P. Mackey
*Attorney, Agent, or Firm*—Staas & Halsey, LLP

[57] ABSTRACT

Principal parts of an injection molding machine (1) are formed by joining a stationary platen (3), moving platen (4), mold clamping mechanism section (7), and rear platen (5) in the order named, the stationary platen (3) and the rear platen (5) are connected by means of tie bars (2), and the moving platen (4) is actuated by means of the mold clamping mechanism section (7) that is provided between the rear platen (5) and the moving platen (4). Guide rods (9) are arranged protruding from that surface of the moving platen (4) which is opposite from the surface on which a stationary-side is mounted, whereby a crosshead (10) is guided in sliding motion. Further, the guide rods (9) are caused to penetrate and project from the rear platen (5), and an injection unit (8) is fixed to their respective distal ends. A slide guide for the crosshead (10) and a support guide for the injection unit (8) are formed integrally with each other, whereby the number of components used and the manufacturing cost are reduced.

10 Claims, 19 Drawing Sheets

INJECTION MOLDING MACHINE

TECHNICAL FIELD

The present invention relates to an improvement of an injection molding machine.

BACKGROUND ART

Horizontal injection molding machines comprise a mold clamping unit and an injection unit that are arranged in the horizontal direction on a base, and is constructed in the following manner, as shown in FIG. 30A, for example.

A mold clamping unit 96 is composed of a stationary platen 3, moving platen 4, rear platen 5, mold clamping mechanism TG, etc. The stationary platen 3 is fixed to a base BS, and is coupled to the rear platen 5 by means of tie bars 2. The moving platen 4 is located between the stationary platen 3 and the rear platen 5, and the tie bars 2 are passed individually through holes that are formed in the moving platen 4. The mold clamping mechanism TG is located between the rear platen 5 and the moving platen 4, and a crosshead 10 moves straight toward the stationary platen 3, thereby carrying out mold closing operation, as a ball screw BT rotates. Molds (stationary mold SM and moving mold MM) are fixed to the stationary platen 3 and the moving platen 4, respectively.

An injection unit 8 is provided on the side of the stationary platen 3 which is remoter from the moving platen 4. When it is moved toward the moving platen 4 by means of a ball screw & nut (nozzle-touch mechanism) NT, a nozzle 12 of an injection cylinder 11 projects through a through hole TH in the central portion of the stationary platen 3, and comes into contact with the stationary-side mold SM.

The injection molding machines described above require use of guide rods (not shown) for assisting the crosshead 10 in rectilinear movement. On the other hand, the injection unit 8 itself is mounted on the base BS of the injection molding machine by means of exclusive guide rods (not shown), such as linear motion guides, and is moved toward or away from the stationary platen 3. Thus, the guide rods for the crosshead 10 are arranged independently of the guide rods for the injection unit 8, in the mold clamping mechanism section.

Vertical injection molding machines comprises a mold clamping unit and an injection unit that are arranged in the vertical direction. Some of them have the same basic construction as the aforementioned horizontal injection molding machines. As shown in FIG. 30B, however, a vertical injection molding machine disclosed in Japanese Patent Publication, KOKAI No. 8-52756, has the following configuration. A moving platen 4 and a rear platen 5 are arranged above and below a stationary platen 3, respectively, that is fixed to a machine frame FR, and they are coupled by means of tie bars 2 that penetrate the stationary platen 3.

Molds (stationary mold SM and moving mold MM) are mounted on the stationary platen 3 and the moving platen 4. An injection unit 8 is located above the moving platen 4 (on the side remoter from the stationary platen 3), and is moved toward the moving platen 4 by means of a ball screw & nut (nozzle-touch mechanism) NT, whereupon a nozzle 12 of an injection cylinder 11 projects through a through hole TH in the central portion of the moving platen 4, and comes into contact with the moving-side mold MM. A mold clamping mechanism TG is located between the stationary platen 3 and the rear platen 5, and a crosshead 10 is moved straight toward the stationary platen 3 by means of a ball screw BT.

The aforementioned vertical injection molding machine, which uses a toggle-type mold clamping mechanism, also require use of guide rods (not shown) for assisting the crosshead 10 in rectilinear movement. On the other hand, the injection unit 8 is guided by exclusive guide rods (not shown) set up on the moving platen 4 as it moves toward or away from the stationary platen 3. Thus, the guide rods for the crosshead 10 are arranged, independently of the guide rods for the injection unit 8, in the mold clamping mechanism section.

Both the horizontal injection molding machine of FIG. 30A and the vertical injection molding machine of FIG. 30B are subject to the following problems.

(a) The overall length is equal to the sum of the length of the injection unit 8 and the length of the mold clamping unit 96, so that it is considerably long.

(b) The guide rods are needed to assist the crosshead 10 of the toggle-type mold clamping mechanism in rectilinear movement. Also, these guide rods are mounted in the mold clamping mechanism section. Since the guide rods for assisting the injection unit 96 in rectilinear movement are provided on the base BS of the injection molding machine or set up on the side of the moving platen 4 remoter from the mold clamping unit, however, the guide rods for the crosshead 10 cannot play the part of the guide rods for the injection unit 96.

An example that deals with the aforesaid problem (a) is disclosed in Japanese Patent Publication, KOKAI No. 8-57896. According to this prior art, the overall length of the injection molding machine is made shorter than the sum of the length of the injection unit 8 and the length of the mold clamping unit 96. Referring now to FIGS. 31A and 31B, this arrangement will be described.

FIG. 31A is a general view of a horizontal injection molding machine, in which a moving platen 4 and a rear platen 5 are arranged on one and the other sides, respectively, of a stationary platen 3 that is fixed to a machine frame FR, and the moving platen 4 and the rear platen 5 are coupled by means of tie bars 2 that penetrate the stationary platen 3.

Molds (stationary mold SM and moving mold MM) are fixed to the stationary platen 3 and the moving platen 4. An injection unit 8 is located on that side of the rear platen 5 remoter from the moving platen 4, and is moved straight toward the stationary platen 3 through a center hole 32 in the rear platen 5 by means of a ball screw & nut (nozzle-touch mechanism) NT. A nozzle 12 of an injection cylinder 11 projects through a through hole 33 in the central portion of the stationary platen 3, and comes into contact with the stationary-side mold SM.

As shown in FIG. 31B, a mold clamping mechanism TG is located between the rear platen 5 and the stationary platen 3, and a crosshead 10 (or a ball nut that replaces the crosshead) moves straight toward the stationary platen 3 as a ball screw BT rotates.

According to the prior art (FIG. 31A) disclosed in KOKAI No. 8-57896, as is evident from comparison between FIGS. 31A and 30A, the overall length of the injection molding machine is so short that the aforesaid problem (a) is solved. However, the aforesaid problem (b) is left unsolved. Thus, according to this prior art, the guide rods (not shown) are needed to assist the crosshead 10 (or the ball nut that replaces it). Since these guide rods cannot play the parts of any other members, however, a number of pieces of parts have to be provided.

According to this prior art, as shown in FIG. 31A, moreover, both the mold clamping mechanism TG and the injection cylinder 11 are located between the rear platen 5 and the stationary platen 3, so that the construction of the mold clamping mechanism TG is subject to restrictions.

This is because a plurality of links 88 must be arranged so as to surround the injection cylinder 11 in the center. In consequence, the ball screw BT, the crosshead 10 (or the ball nut that replaces it), and a coupling link for connecting each link 88 and the crosshead 10 must be provided for each of the links 88 so that the links 88 can bend and stretch separately, as shown in FIG. 31B. Also, there is a problem such that a strong bending moment acts on the ball screws BT that are in engagement with the crossheads 10 when the toggle links 88 are locked up.

DISCLOSURE OF THE INVENTION

The object of the present invention is to provide an injection molding machine with a reduced overall length, in which guide rods for guiding a crosshead of a mold clamping mechanism section are used also as guide rods for guiding an injection unit, whereby the number of components therein is reduced.

In order to achieve the above object, an injection molding machine according to the present invention comprises: a stationary platen fixed to a machine frame of the injection molding machine; a rear platen fixed to the respective one ends of a plurality of tie bars, the respective other ends of the tie bars being fixed to the stationary platen; a moving platen arranged between the stationary platen and the rear platen with the tie bars passing through the through holes formed on the moving platen for the passage of the tie bars; an injection unit arranged on the side of the rear platen not opposed to the moving platen and fixed to the respective one ends of guide rods, the respective other ends of the guide rods being fixed to the surface of the moving platen on which a moving mold is not to be mounted; a moving mold and a stationary mold which are mounted opposite on the moving platen and the stationary platen, respectively; and a toggle-type mold clamping mechanism arranged between the rear platen and the moving platen and is provided with a crosshead having through holes formed for the passage of the guide rods, with the guide rods passing through the through holes. An injection cylinder of the injection unit passes through hole formed in the center of the rear platen, a gap formed in the center of the mold clamping mechanism, and a through hole formed in the center of the moving platen; the crosshead moves in a straight line, guided by the guide rods, when the crosshead is driven, so that the moving platen and the injection unit, coupled to the moving platen by means of the guide rods, moves toward or away from the stationary platen.

According to the present invention, slide guiding for the crosshead of the mold clamping mechanism section and support of the injection unit can be achieved simultaneously by using a single guide rod, so that exclusive guides need not be provided for supporting the crosshead and the injection unit. Thus, the number of components used and the manufacturing cost of the injection molding machine can be reduced.

Since mold clamping and mold opening operations are carried out by means of a plurality of toggle links that are connected to the single crosshead, moreover, a force from the crosshead links that acts during the mold clamping operation is canceled in the crosshead, and stable mold clamping and mold opening operations can be carried out without any undue bending moments acting on ball screws for driving the crosshead or the guide rods.

BEST MODE FOR CARRYING OUT THE INVENTION

Referring first to FIGS. 1 to 17, a first embodiment of the present invention will be described.

Figure 1:
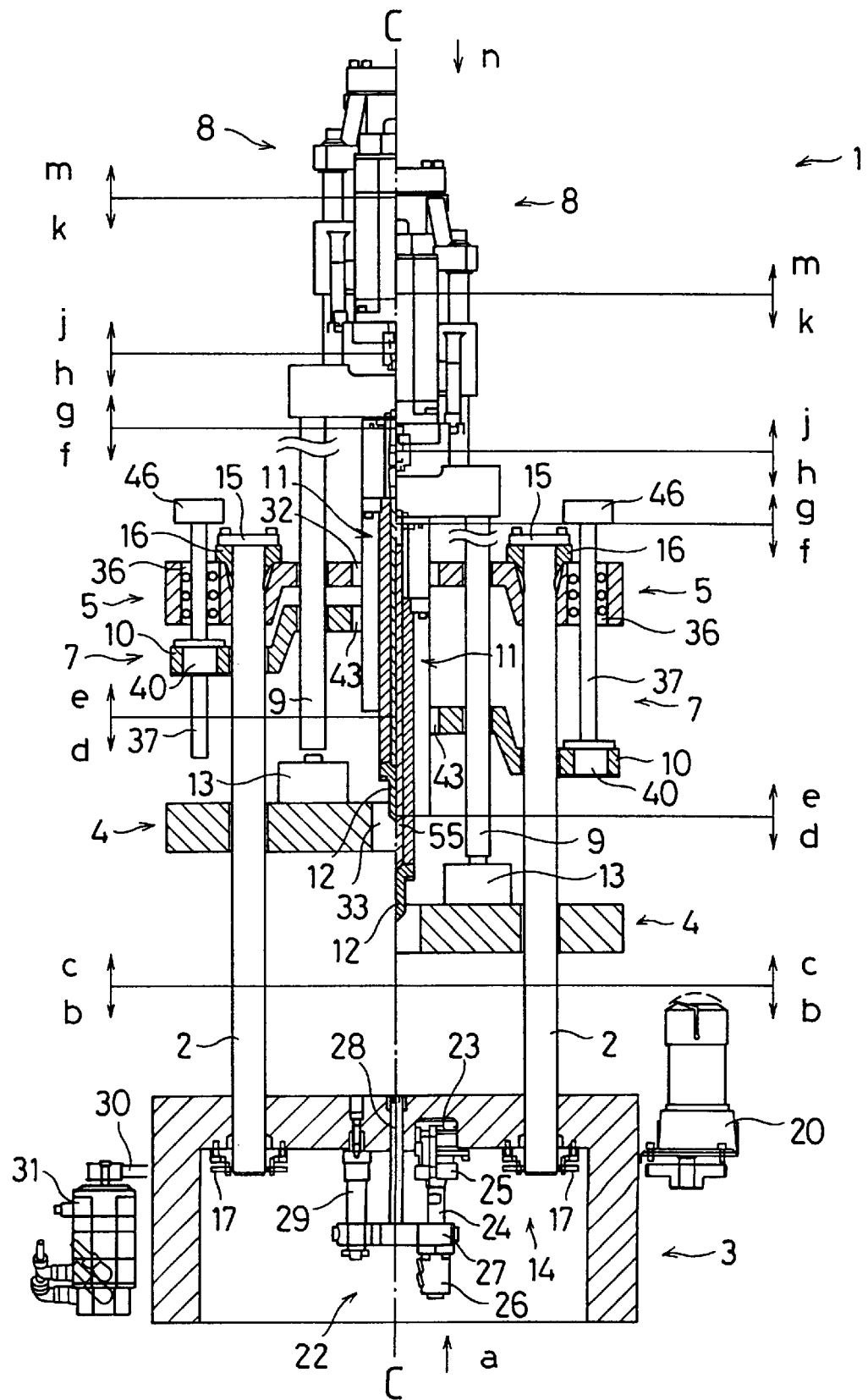
FIG. 1 is a sectional view showing principal parts of a vertical injection molding machine according to a first embodiment of the present invention.
Figure 2:
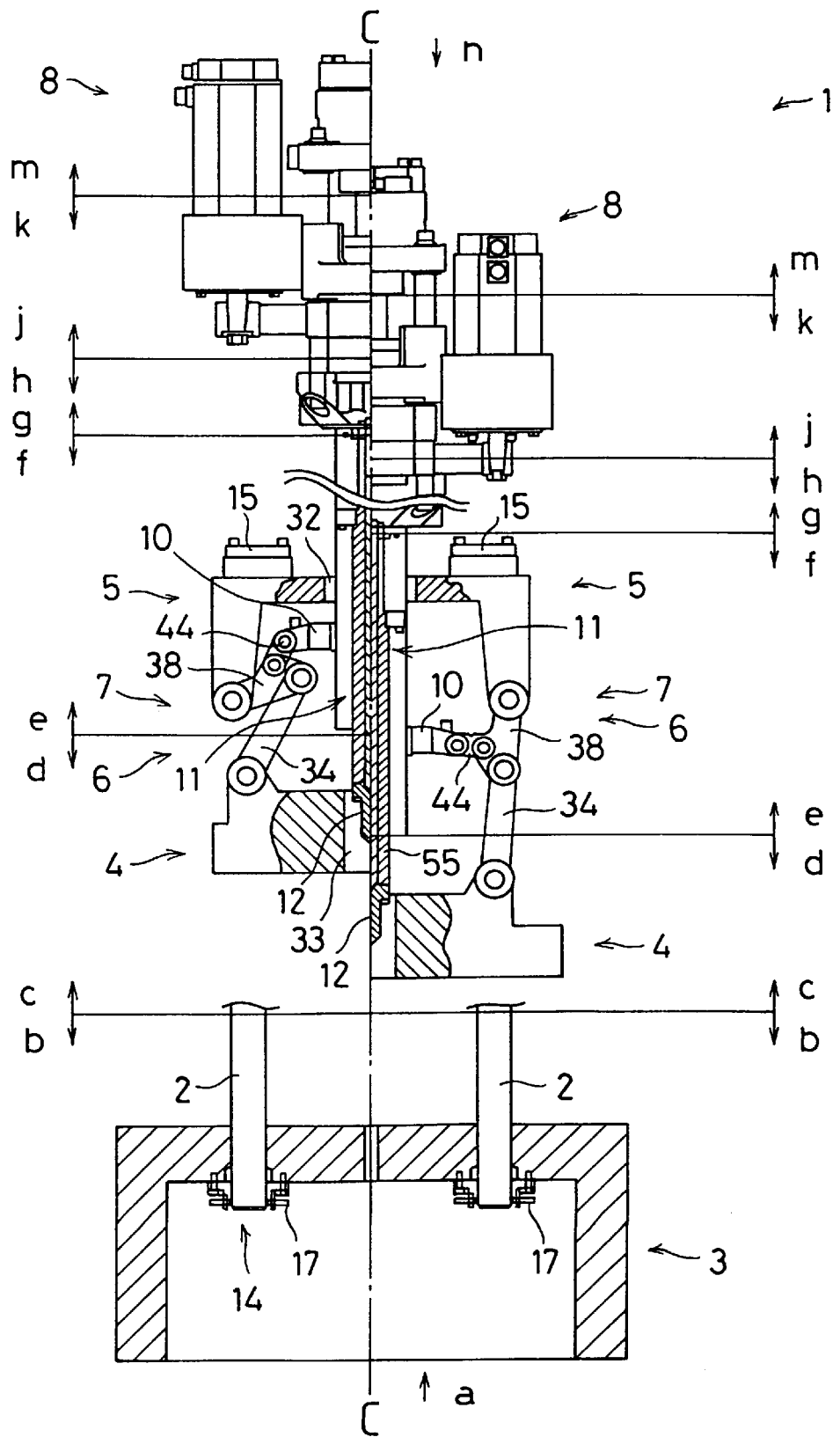
FIG. 2 is a sectional view of the principal parts of the vertical injection molding machine of FIG. 1 taken at another angle.

Referring to FIGS. 1 and 2, an arrangement of principal parts of a vertical injection molding machine 1 according to the first embodiment will be described.

Figure 3:
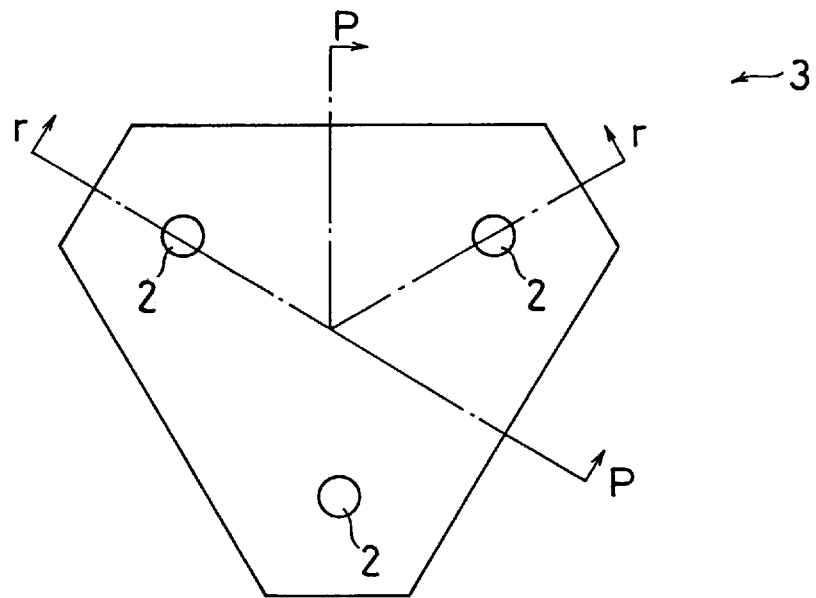
FIG. 3 is a plan view of a stationary platen used in the injection molding machine of FIG. 1 taken in the direction of arrow b—b of FIG. 1.

A mold clamping mechanism section 7 of the vertical injection molding machine 1 uses three tie bars 2 that are arranged at regular intervals on the circumference of a circle around an axis C—C. A stationary platen 3 is coupled to the respective lower ends of these tie bars 2, and a rear platen 5 to the upper ends. Thus, the space between the stationary platen 3 and the rear platen 5 is kept constant. A moving platen 4 is arranged between the stationary platen 3 and the rear platen 5. The moving platen 4 is formed with through holes that have a diameter large enough to allow free passage of the tie bars 2. The tie bars 2 penetrate these through holes, individually, for sliding motion. The stationary platen 3, moving platen 4 and rear platen 5 have a form of an equilateral triangle with the vertexes thereof cut off, each. FIG. 3 shows the form of the stationary platen 3.

Arranged between the rear platen 5 and the moving platen 4, moreover, is a mold clamping mechanism section 7 that includes toggle links 6. As the mold clamping mechanism section 7 is actuated (toggle links 6 bend or stretch), the moving platen 4 moves toward or away from the stationary platen 3. In FIGS. 1 and 2, the portion on the left-hand side of the axis C—C represents a state in which the moving platen 4 is situated remote from the stationary platen 3, while the right-hand side portion represents a state in which the moving platen 4 is situated nearest to the stationary platen 3.

The moving platen 4 is fitted with a moving mold (not shown) on that surface thereof which faces the stationary platen 3, and the stationary platen 3 is fitted with a stationary mold (not shown) on that surface thereof which faces the moving platen 4. A mold thickness adjusting mechanism 14 (mentioned later) is provided on the side of the stationary platen 3.

Figure 5:
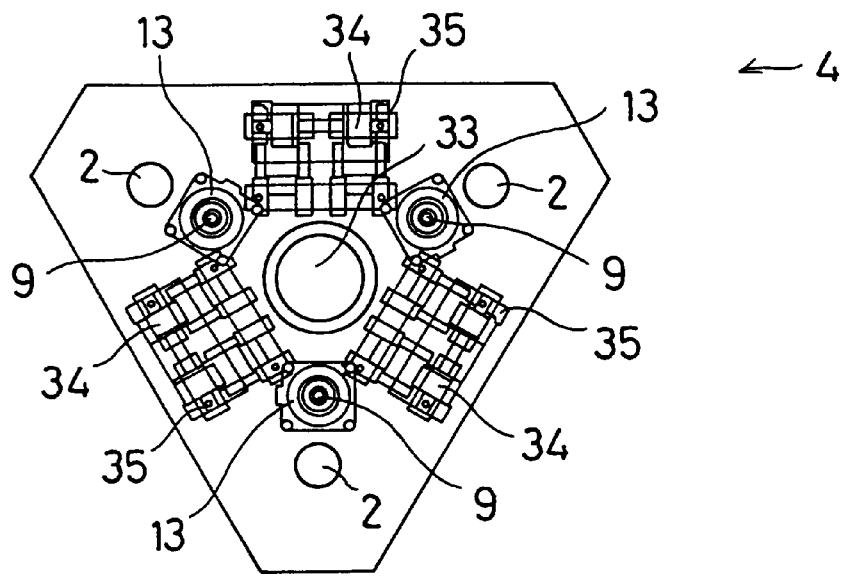
FIG. 5 is a plan view of a moving platen used in the injection molding machine of FIG. 1 taken in the direction of arrow d—d of FIG. 1)

As shown FIG. 1, three guide rods 9 are set up individually on air cylinders 13 (mentioned later) on the upper surface (on the side remoter from the stationary platen 3) of the moving platen 4. These guide rods 9 are arranged at regular intervals on the circumference of a circle around the axis C—C, and as shown in FIG. 5, are arranged nearer to the center (axis C—C) than the tie bars 2. The guide rods 9 penetrate a crosshead 10 that constitutes part of the mold clamping mechanism section 7, and further penetrate the rear platen 5 so as to project above it, having their respective upper end portions fixed to an injection unit 8 that is provided with an injection cylinder 11. Thus, the moving platen 4 and the injection cylinder 11 are coupled to each other by means of the guide rods 9, and the injection cylinder 11 is provided on the upper side of the rear platen 5 (the side not opposed to the moving platen 4).

When its axis is in line with the axis C—C of the injection molding machine, the injection cylinder 11 penetrates a through hole 32 bored in the central portion of the rear platen 5, a through hole 43 bored in the central portion of the crosshead 10, and a through hole 33 bored in the central portion of the moving platen 4.

The crosshead 10 of the mold clamping mechanism section 7 is guided for up-and-down motion (motion in the mold opening or closing direction) by the guide rods 9. When the crosshead 10 is actuated (mentioned later), the mold clamping mechanism section 7 operates so that the distance between the rear platen 5 and the moving platen 4 changes. Thus, the moving platen 4 moves in the direction of the axis C—C. When the moving platen 4 moves, the injection cylinder 11, which is coupled to the moving platen 4 by means of the guide rods 9, also moves at the same time without changing its position relative to the moving platen 4.

As the moving platen 4, having the moving-side mold (not shown) fixed thereon, moves in the mold clamping direction, therefore, the injection cylinder 11 moves integrally with the moving-side mold, and the distal end of a nozzle 12 is kept in contact with a sprue of the moving-side mold that is mounted on the moving platen 4. Thus, a nozzle-touch state is maintained.

According to this embodiment, as described above, the guide rods 9 for supporting the injection unit 8 on the moving platen 4 to keep the distance between the injection unit 8 and the moving platen 4 constant serve also as guide rods for guiding the crosshead 10 of the mold clamping mechanism section 7 in rectilinear movement. Thus, the number of components used can be reduced.

As shown in FIG. 1, moreover, the guide rods 9 are fixed to the moving platen 4 by means of the air cylinders 13, individually. By causing these three air cylinders 13 synchronously to project, therefore, the nozzle 12 can be separated as required from the sprue of the moving-side mold so that it can carry out sprue-break operation. A drive mechanism for moving the guide rods 9 up and down may be formed of a rectilinear motion mechanism that comprises ball screws, ball nuts, etc., as well as of the air cylinders 13.

The following is a description of arrangements of various parts, such as the mold thickness adjusting mechanism, mold clamping mechanism section 7, etc., which constitute the vertical injection molding machine 1 according to the first embodiment.

[Mold Thickness Adjusting Mechanism]

Figure 7:
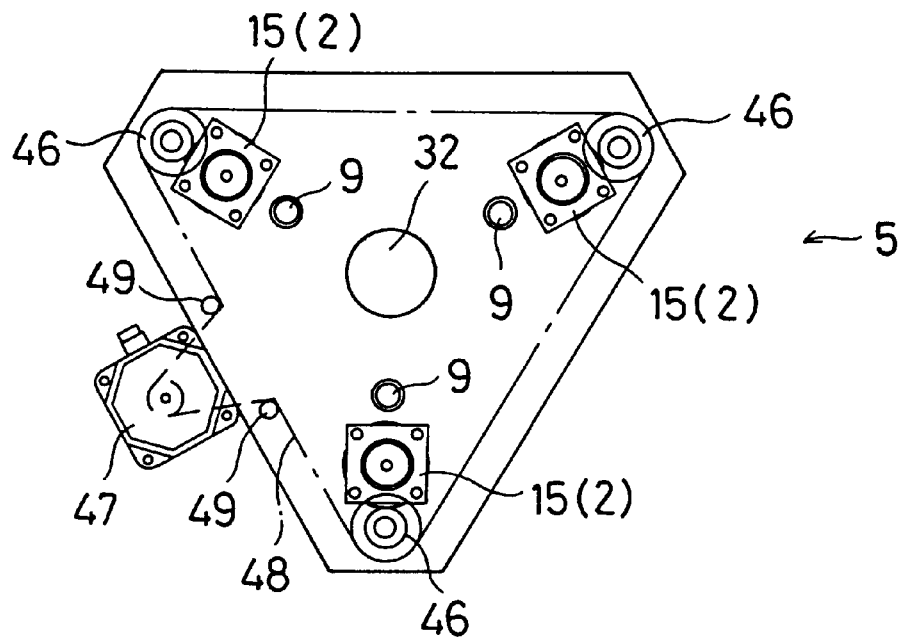
FIG. 7 is a plan view of a rear platen used in the injection molding machine of FIG. 1 taken in the direction of arrow f—f of FIG. 1.

As shown in FIG. 1, a broadened rectangular stopper portion 15 is provided integrally on the upper end of each of the three tie bars 2. As shown in FIG. 7, each stopper portion 15 is fixed to the rear platen 5 by means of bolts that penetrate its four corners, individually. As a result, the rear platen 5 is fixed to the tie bars 2 so as to keep a fixed distance from the stationary platen 3. In order to regulate the distance between the stationary platen 3 and the rear platen 5 based on the mold thickness, therefore, it is necessary to adjust the amount of plunge of the lower end portions of the tie bars 2 with respect to the stationary platen 3. The mold thickness adjusting mechanism 14 for carrying out this adjustment is provided on the side of the stationary platen 3.

Figure 4:
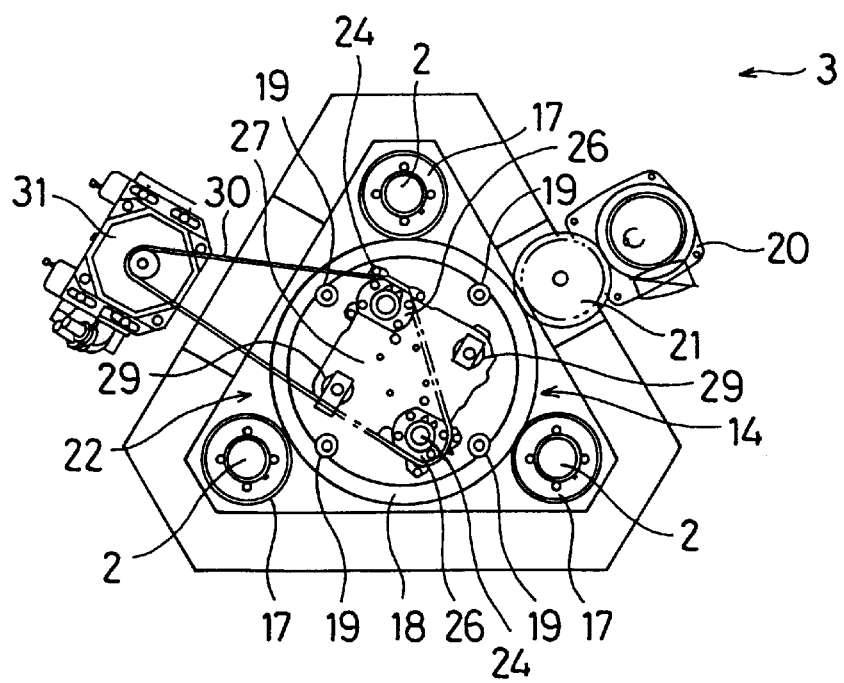
FIG. 4 is a plan view of the stationary platen of FIG. 3 taken from the opposite side (in the direction of arrow a of FIG. 1)

As shown in FIG. 1, the lower end portion of each tie bar 2 projects downward through the stationary platen 3, and an external thread portion cut in the lower end portion of each tie bar 2 is screwed in a die height adjusting nut 17 that is mounted on the lower surface side of the stationary platen 3 (on the side remoter from the moving platen 4) so as to be rotatable and immovable in the axial direction. Since a peripheral wall is formed integrally on the outer peripheral portion of the lower surface of the stationary platen 3 to form a cup-shaped base, machine elements such as the die height adjusting nut 17 never interfere with the floor surface. As shown in FIG. 4, moreover, an external gear 18 in the form of a circular ring internally touching a thread portion cut in the outer peripheral portion of each die height adjusting nut 17 is rotatably held on the lower surface of the stationary platen 3 by means of four rollers 19, and is rotated by a die height adjusting motor 20 fixed to a side of the peripheral wall of the stationary platen 3, through an intermediate gear 21.

When the die height adjusting motor 20 is actuated, the intermediate gear 21 and the external gear 18 rotate, and moreover, the three die height adjusting nuts 17 in contact with the external gear 18 rotate all together in the same direction. Thus, all the three tie bars 2 that are screwed individually in the die height adjusting nuts 17 synchronously project upward or recede downward together from the stationary platen 3, whereby the distance between the stationary platen 3 and the rear platen 5, that is, the mold thickness, is adjusted. Alternatively, the external gear 18 (FIG. 4) may be replaced with a pulley of the same diameter such that the power of the die height adjusting motor 20 can be transmitted by means of a timing belt. If a peripheral groove having a depth greater than the thickness of the timing belt is formed in the thickness-direction central portion of the outer peripheral portion of the pulley, the timing belt can be prevented from interfering with the die height adjusting nuts 17.

[Ejector Mechanism]

As shown in FIGS. 1 and 4, an ejector mechanism 22, along with the mold thickness adjusting mechanism 14, is provided on the surface of the stationary platen 3 which is opposite from the side on which the stationary mold is mounted.

The ejector mechanism 22 is composed of ball screws 24 mounted on the aforesaid surface of the stationary platen 3 by means of bearings 23 so as to be rotatable and immovable in the axial direction, pulleys 25 fixed integrally on the respective proximal portions of the ball screws 24, ball nuts 26 in mesh with the ball screws 24, individually, an ejector plate 27 having the ball nuts 26 fixed integrally thereon, an ejector rod 28 set up integrally on the central portion of the ejector plate 27 and penetrating a hole in the central portion of the stationary platen 3, plate guides 29 set up on the lower surface of the stationary platen 3 and penetrating the ejector plate 27, etc.

As shown in FIG. 4, the ejector plate 27 has a substantially square external shape, and the ball screws 24 and the plate guides 29 are arranged in two sets in positions on diagonal lines corresponding to the four corners of the square. A timing belt 30, which is driven by means of an ejector servomotor 31, is passed around the pulleys 25 on the individual ball screws 24. As the ejector servomotor 31 rotates, the two ball screws 24 synchronously rotate in the same direction. As a result, the ejector plate 27, which has the ball nuts 26 fixed integrally thereon, moves toward or away from the stationary platen 3 along the two plate guides 29, and the ejector rod 28, which is fixed to the ejector plate 27, projects or recedes from that surface of the stationary platen 3 on which the stationary-side mold is mounted, thus moving in the mold clamping or mold opening direction, and drives an ejector pin of the stationary mold (not shown).

[Moving Platen]

Figure 6:
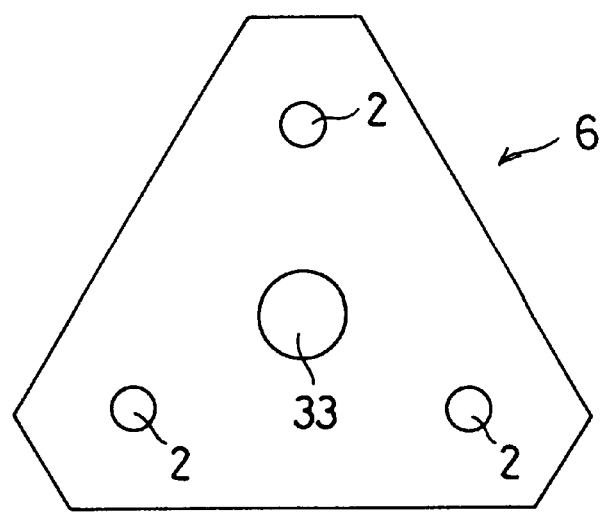
FIG. 6 is a plan view of the moving platen of FIG. 5 taken from the opposite side (in the direction of arrow c—c of FIG. 1)

As shown in FIGS. 5 and 6, the moving platen 4 fitted on which a moving mold is mounted, like the stationary platen 3 (FIG. 3), has a form of an equilateral triangle with the vertexes cut off. A through hole 33 is bored in its central portion, through which the injection cylinder 11 is passed. Through holes in which the tie bars 2 are slidingly fitted are provided individually in three spots on the outer peripheral portion corresponding to the vertexes of the equilateral triangle.

As shown in FIG. 5, moreover, the three guide rods 9, which are situated inside the tie bars 2 corresponding thereto in position, are set up on the upper surface (the surface on which a moving mold is not to be mounted) of the moving platen 4 by means of the air cylinders 13, individually. Further, a staple 35 for pivotally mounting a first link 34, which constitutes part of each toggle link 6, is fixed on the portion of the upper surface of the moving platen 4 which is situated between each two adjacent tie bars 2. As shown in FIG. 5, the first link 34 is bifurcated at its end portion, and the staple 35 is provided with three projections that pivotally support the first link 34 so as to hold the bifurcated portion between them. The first link 34 rocks in the diametrical direction of the through hole 33.

[Rear Platen]

Figure 8:
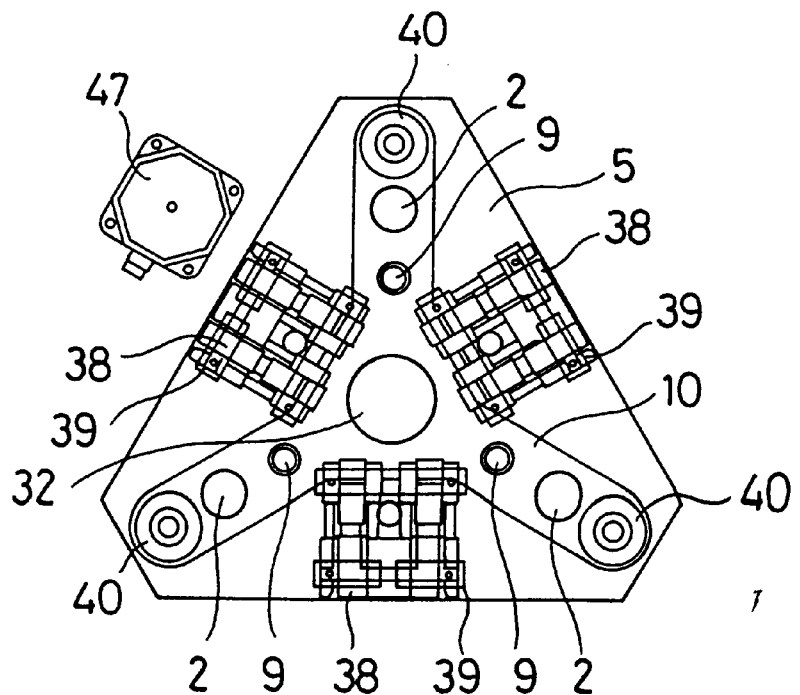
FIG. 8 is a plan view of the rear platen of FIG. 7 taken from the opposite side (in the direction of arrow e—e of FIG. 1)

As shown in FIGS. 7 and 8, the rear platen 5, like the moving platen 4 and the stationary platen 3, has a form of an equilateral triangle with the vertexes cut off. A through hole 32 is bored in its central portion, through which the injection cylinder 11 is passed. As shown in FIG. 7, moreover, the stopper portions 15 on the respective end portions of the tie bars 2 are fixed with bolts individually at three spots on the outer periphery of the upper surface (surface not opposed to the moving platen 4) of the rear platen 5. Further, through holes for the passage of the guide rods 9 are bored through the portions of the rear platen 5 which are situated nearer to the through hole 32 than the positions in which the stopper portions 15 are fixed.

As shown in FIG. 8, a staple 39 for pivotally mounting a second link 38, which constitutes part of each toggle link 6, is fixed on the portion of the lower surface of the rear platen 5 which is situated between each two adjacent tie bars 2. An end portion of the bifurcated second link 38 is pivotally attached to the staple 39. As shown in FIG. 2, the other end portion of the second link 38 is pivotally attached to the first link 34.

[Mold Clamping Mechanism Section]

In the injection molding machine according to this embodiment, as mentioned before, the injection cylinder 11 penetrates the center of the mold clamping mechanism section. Unlike the conventional toggle-type mold clamping mechanism, the mold clamping mechanism section 7 cannot be designed so that the ball screws and the like for driving the crosshead 10 are arranged penetrating its center.

To cope with this problem, according to the present embodiment, bearings 36 (FIG. 1) are embedded individually in three positions on the outer periphery of the rear platen 5 outside the positions in which the tie bars 2 penetrate the rear platen 5. Ball screws 37 for driving the crosshead 10 are supported individually by means of the bearings 36 so as to be rotatable and immovable in the axial direction. A pulley 46 is fixed to the upper end of each ball screw 37. As shown in FIG. 7, a timing belt 48 is passed around the pulleys 46 and a servomotor 47 for mold clamping so that the three ball screws 37 synchronously rotate in the same direction as the servomotor 47 for mold clamping rotates. Reference numeral 49 denotes a small pulley for regulating the path of travel of the timing belt 48.

Figure 9:
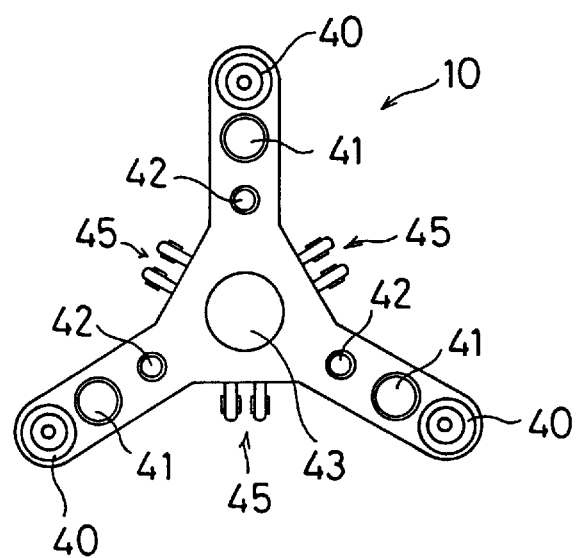
FIG. 9 is a plan view showing a crosshead used in the injection molding machine of FIG. 1.

As shown in FIGS. 8 and 9, the crosshead 10 is formed of a sheet of a substantially Y-shaped plate. More specifically, it has a form such that three arm portions protrude radially from its central portion at intervals of 120° between them. Each arm portion is formed with a through hole 41 through which a tie bar 2 passes and a through hole 42 through which a rod 9 passes. Integrally embedded in the extreme end portion of each arm portion, moreover, is a ball nut 40 to mate with each corresponding ball screw 37. The crosshead 10 is guided mainly by the guide rods 9 in movement in the direction of the axis C—C.

Further, the through hole 43 through which the injection cylinder 11 passes is bored in the central portion of the crosshead 10. As shown in FIG. 9, moreover, a staple 45 for pivotally mounting one end of a crosshead link 44 (FIG. 2) is fixed to the portion of the outer peripheral portion of the central portion of the crosshead 10 which is situated between each two adjacent arm portions. As shown in FIG. 2, the other end of each crosshead link 44 is pivotally mounted on the central portion of its corresponding second link 38.

Thus, when the servomotor 47 for mold clamping is driven to rotate the three ball screws 37 (FIG. 1) synchronously, thereby feeding the crosshead 10 toward the rear platen 5, the second links 38 and the first links 34, which constitute the toggle links 6, bend to carry out mold opening operation (state on the left-hand side of the dashed line of FIGS. 1 and 2). When the crosshead 10 is fed away from the rear platen 5, in contrast with this, the second links 38 and the first links 34 stretch, thereby carrying out mold clamping operation (state on the right-hand side of the dashed line of FIGS. 1 and 2).

Figure 31A:
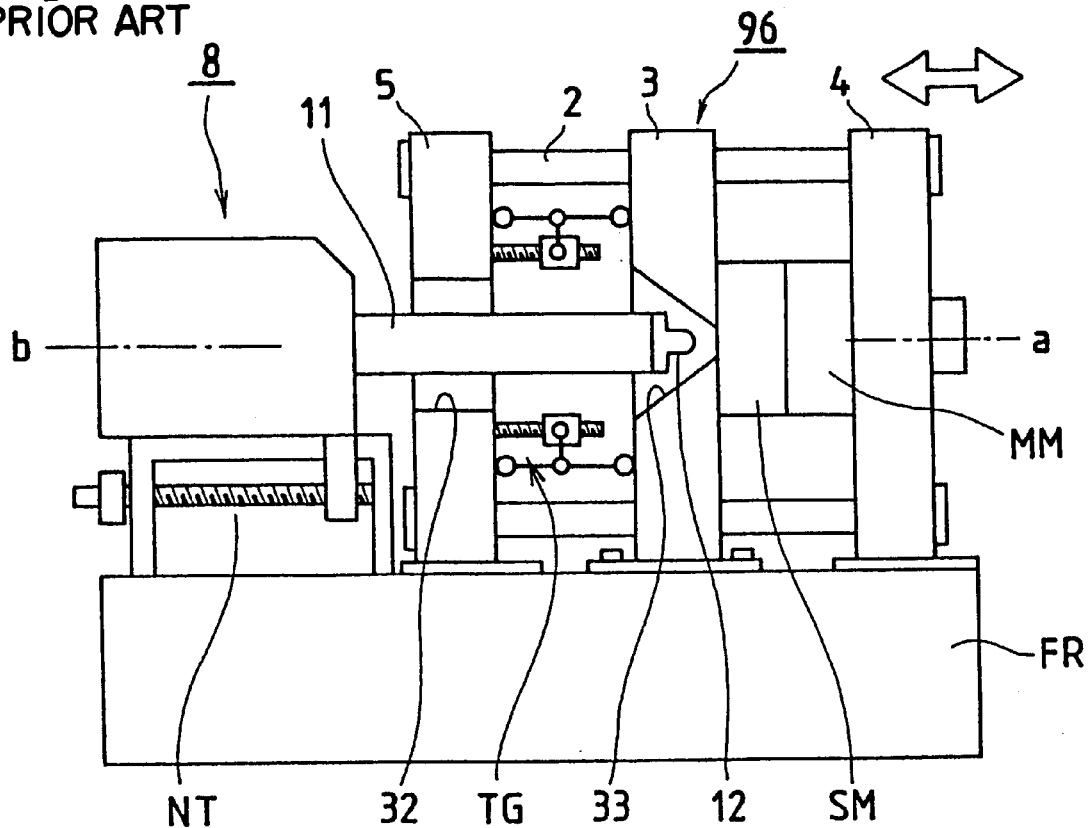
FIG. 31A is a view for illustrating a general construction of another example of a conventional horizontal injection molding machine.
Figure 31B:
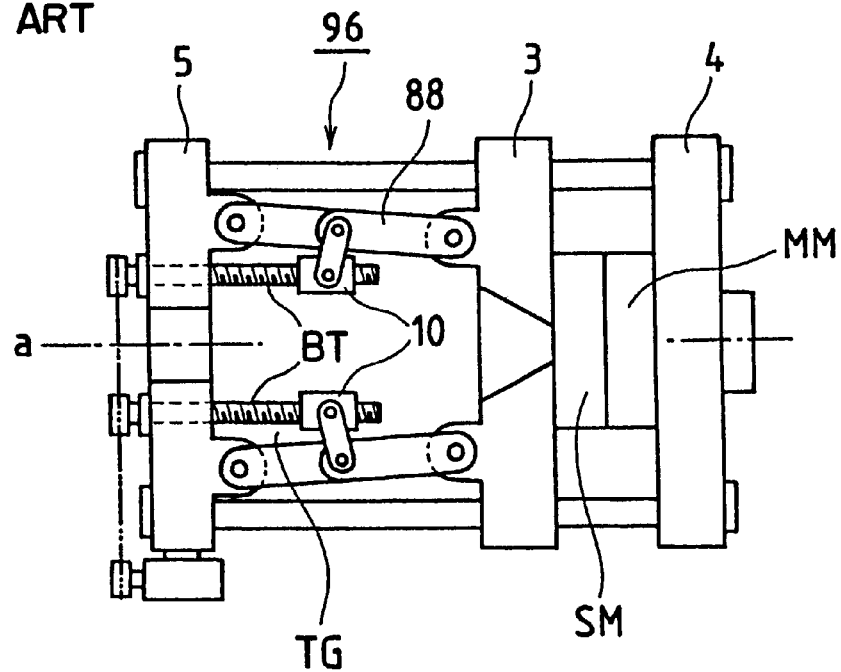
FIG. 31B is a view for illustrating a mold clamping mechanism section in the injection molding machine of FIG. 31A.

When locking up the mold is completed, strong forces from the second links 38 and the first links 34 act so as to push in the crosshead links 44. The staples 45 (FIG. 9) that support the crosshead links 44 are fixed to the crosshead 10 formed of a Y-shaped plate, arranged circumferentially at regular intervals around the axis C—C, so that forces to press the crosshead links 44 are perfectly balanced as an internal stress of the crosshead 10. In this case, unlike the prior art case (example disclosed in KOKAI No. 8-57896) shown in FIGS. 31A and 31B, therefore, no substantial forces externally act so as to drive out the crosshead 10 sideways, and there act neither bending moments on the ball screws 37 that are connected to the crosshead 10 nor forces to press the through holes 41 and 42 of the crosshead 10 against the guide rods 9.

[Injection Unit]

Figure 14:
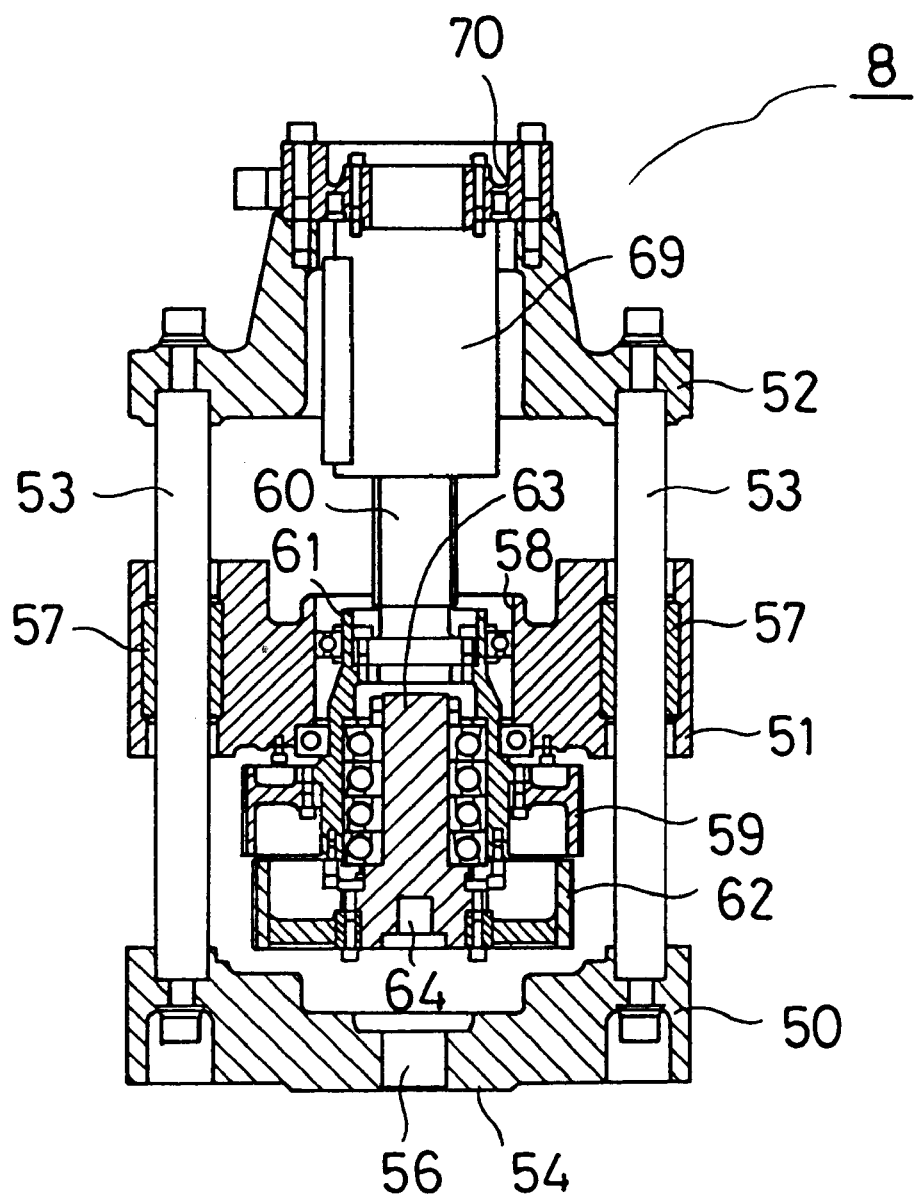
FIG. 14 is a sectional view of the injection unit used the injection molding machine of FIG. 1.

As shown in FIG. 14 the injection unit 8, which is fixed to the respective distal ends of the guide rods 9 projecting upward from the rear platen 5, is composed of a front plate 50, pusher plate 51, rear plate 52, tie rods 53, etc., in general.

Figure 10:
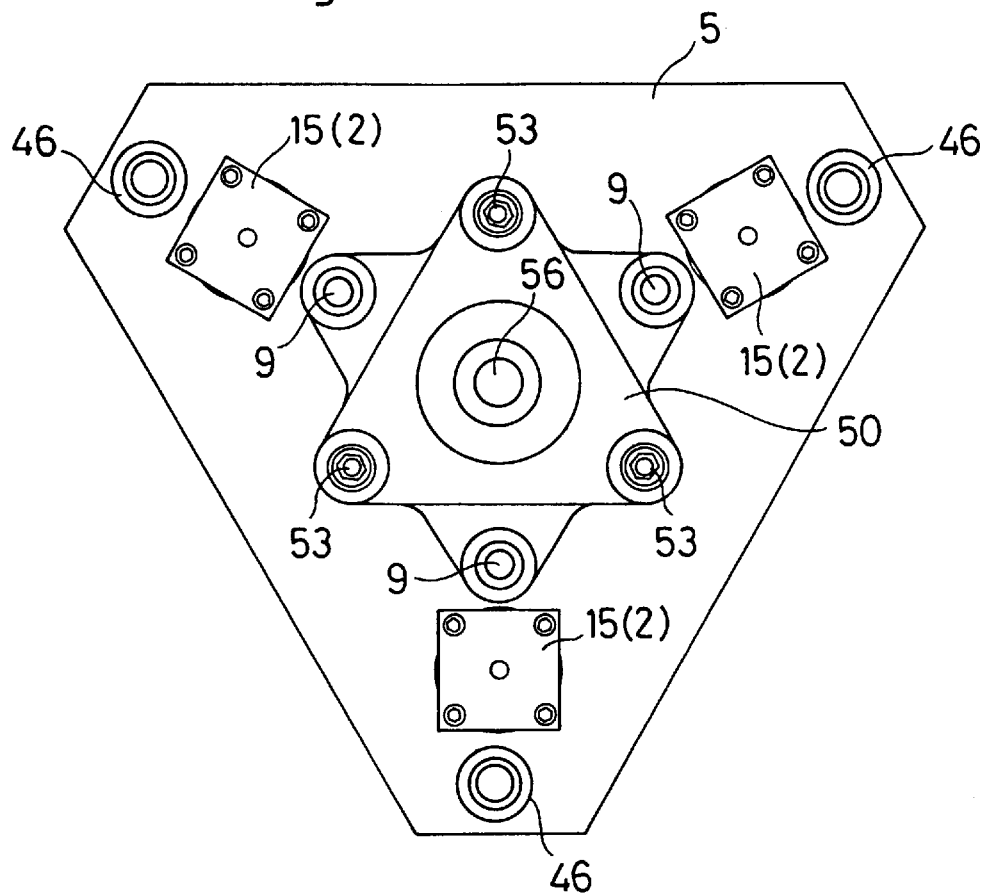
FIG. 10 is a plan view of the rear platen and an injection unit used in the injection molding machine of FIG. 1 taken in the direction of arrow h—h of FIG. 1.
Figure 11:
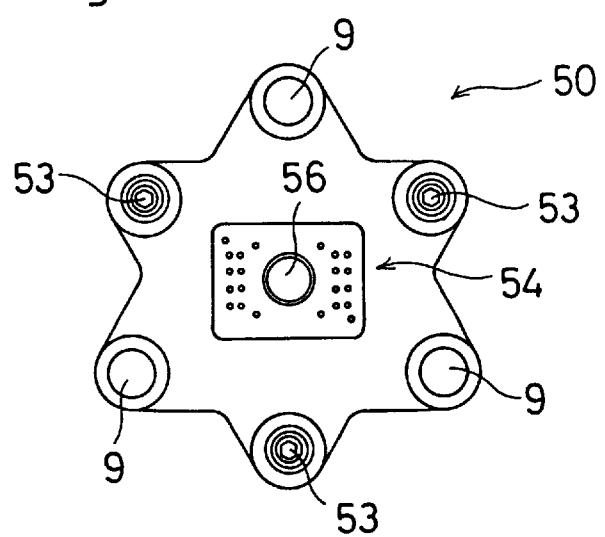
FIG. 11 is a plan view of a front plate of the injection unit of FIG. 1 taken in the direction of arrow g—g of FIG. 1.
Figure 15:
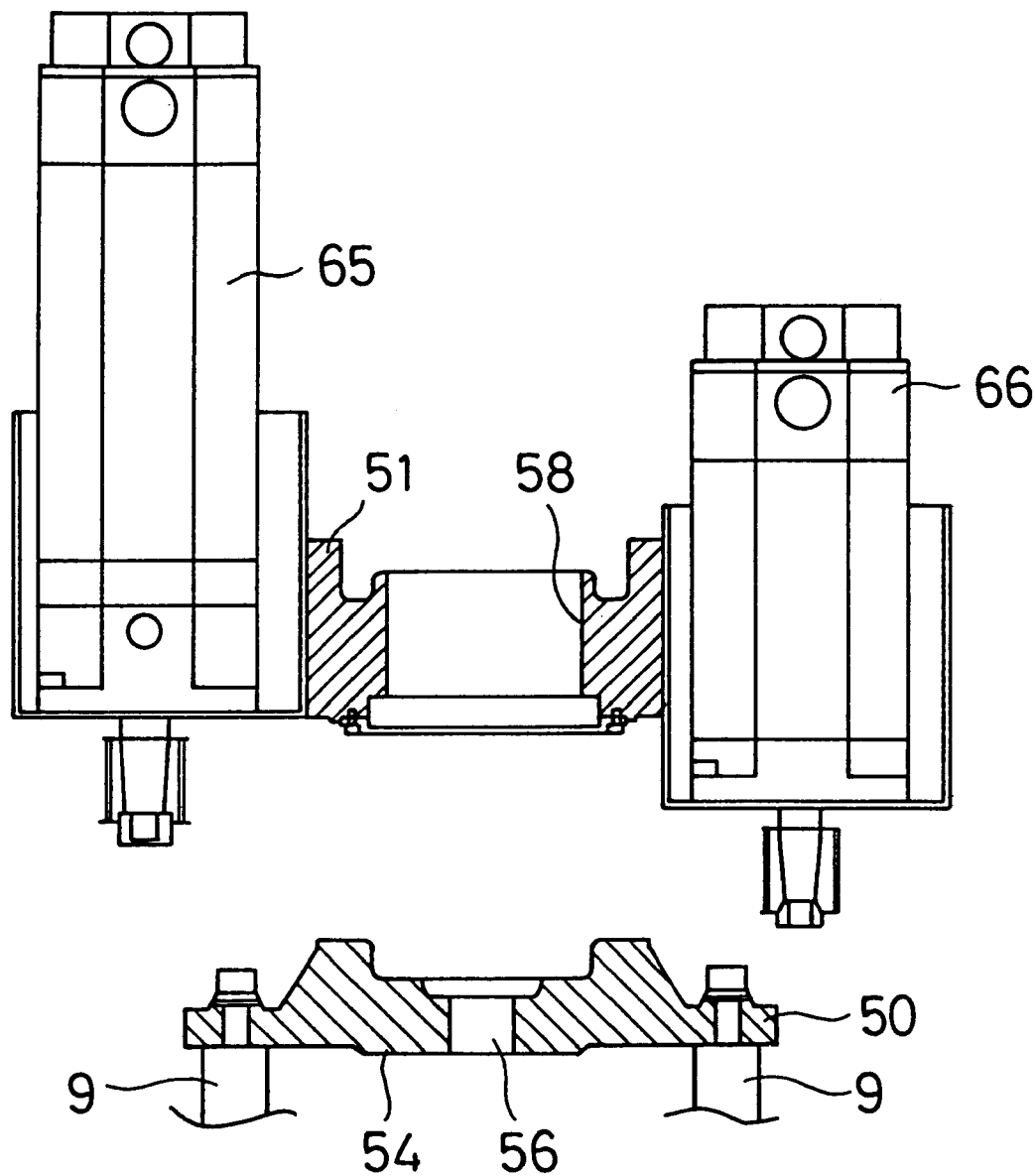
FIG. 15 is a view showing the way a motor of the injection unit of FIG. 14 is mounted.

As shown in FIG. 10, the front plate 50 has a shape obtained by concentrically joining together two equilateral triangles of the same shape with an angular shift of 60°. As shown in FIGS. 10 and 15, those three spots on the outer peripheral portion which correspond individually to the vertexes of one of the equilateral triangles are fixed individually to the respective distal ends of the guide rods 9. As shown in FIG. 14, the three tie rods 53 are set up integrally by means of bolts or the like on those three spots on the outer peripheral portion which correspond individually to the vertexes of the other equilateral triangle. As shown in FIG. 11, moreover, a water jacket (not shown) and a mounting portion 54 for mounting the injection cylinder 11 are provided on the lower surface (surface opposed to the rear platen) of the front plate 50, and a through hole 56 to be penetrated by an injection screw 55 is bored through the center of the front plate 50.

Figure 12:
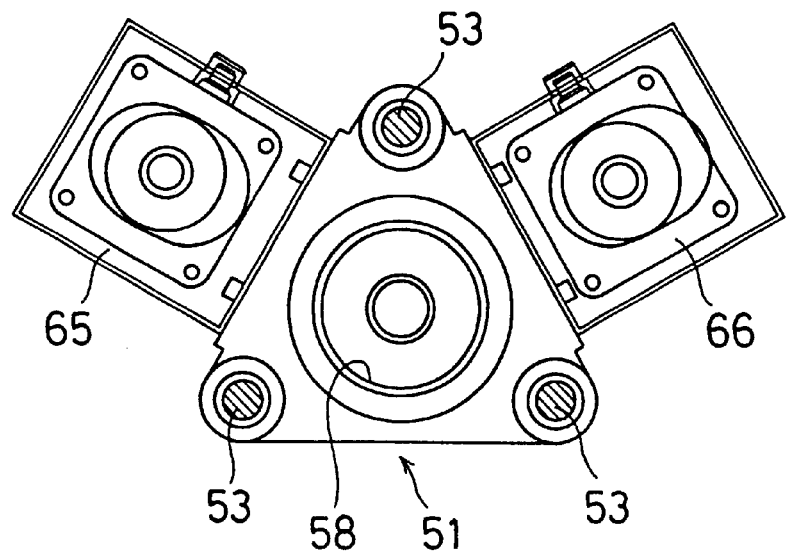
FIG. 12 is a plan view of a pusher plate of the injection unit of FIG. 1 taken in the direction of arrow k—k of FIG. 1.
Figure 13:
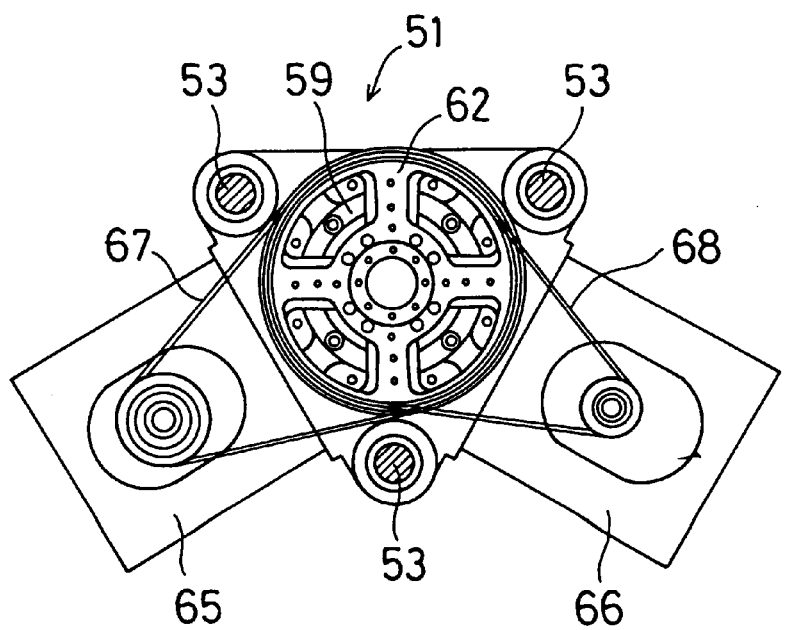
FIG. 13 is a plan view of the pusher plate of FIG. 12 taken from the opposite side (in the direction of arrow k—k of FIG. 1)

As shown in FIGS. 12 and 13, the pusher plate 51 has substantially the same external shape as the one equilateral triangle that constitutes the front plate 50. Through holes to be penetrated by the tie rods 53 are bored in positions corresponding individually to the vertexes of the equilateral triangular shape of the pusher plate 51, and a bush 57 (FIG. 4) is fitted in the inner peripheral surface of each through hole.

Figure 16:
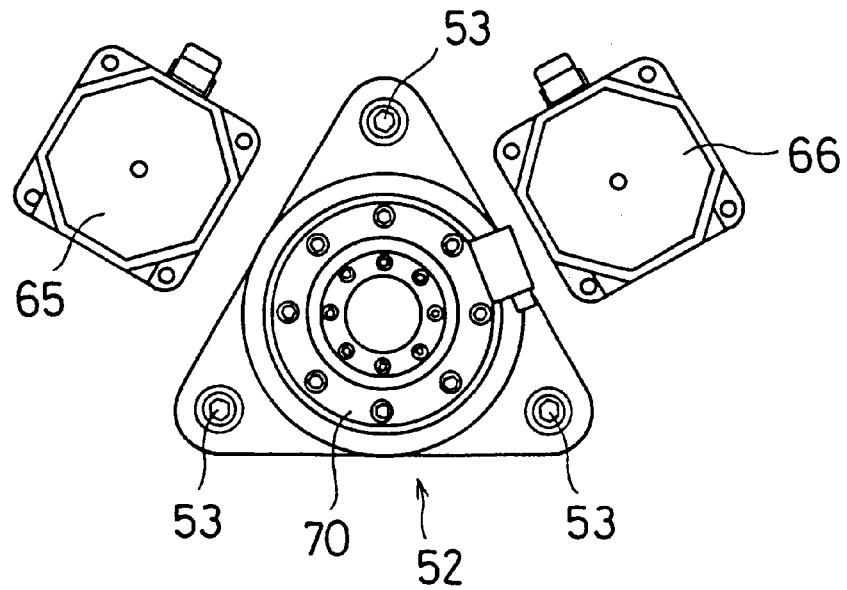
FIG. 16 is a plan view of a rear plate of the injection unit of FIG. 14 taken in the direction of arrow n of FIG. 1.
Figure 17:
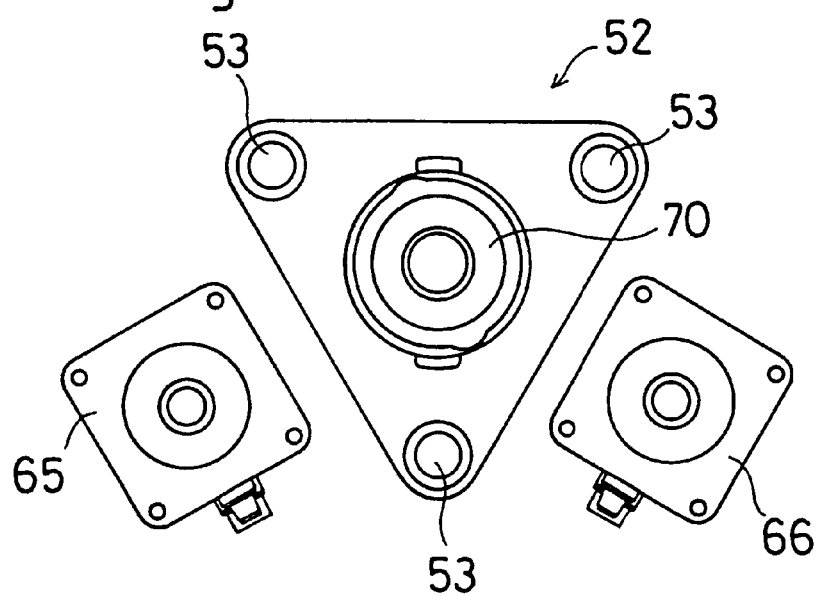
FIG. 17 is a plan view of the rear plate of FIG. 16 taken from the opposite side (in the direction of arrow m—m of FIG. 1)

As shown in FIGS. 16 and 17, the rear plate 52 also has substantially the same external shape as that of the pusher plate 51. The rear plate 52 is fixed to the respective end portions of the tie rods 53 by means of bolts or the like.

As shown in FIG. 14, an injection pulley 59 and an injection ball screw 60 are fixed to a sleeve 61, which is fitted in a large-diameter through hole 58 formed in the central portion of the pusher plate 51 by means of two bearings so as to be rotatable and immovable in the axial direction. A screw fixing sleeve 63, having a screw rotating pulley 62 fixed integrally thereon, is attached to the inside of the sleeve 61 by means of four bearings so as to be rotatable and immovable in the axial direction. Further, the injection screw 55 is removably fitted into a hole 64 formed in the lower end of the screw fixing sleeve 63, by means of a split ring or the like which serves as a key or cotter.

As shown in FIGS. 12, 13 and 15, an injection servomotor 65 and a metering motor 66 are fixed to the outer peripheral portion of the pusher plate 51 so that the injection pulley 59 and screw rotating pulley 62 can be rotated independently of each other by the individual motors with the aid of timing belts 67 and 68.

As shown in FIG. 14, the sleeve 61 and the screw fixing sleeve 63 are independently attached to the pusher plate 51 for rotation without being associated with each other. When only the metering motor 66 is rotated with the injection servomotor 65 stopped, therefore, the screw fixing sleeve 63 and the injection screw 55 attached thereto rotate without moving in the axial direction. Also, the ball screw 60 fixed to the sleeve 61 is screwed in a ball nut 69 that is fixed to the rear plate 52. When only the injection servomotor 65 is rotated with the metering motor 66 stopped, therefore, the pusher plate 51 itself is axially fed by the rotatory motion of the ball screw 60, so that the pusher plate 51 moves toward or away from the rear plate 52, and the injection screw 55 moves integrally with various members attached to the pusher plate 51 in the axial direction.

Since the ball nut 69 that supports the ball screw 60 is attached to the rear plate 52 through a ring-shaped load cell 70 (FIG. 14) that is formed of a magnetostrictive material, axial forces acting on the ball screw 60, that is, injection pressure, dwell pressure, and back pressure, can be detected by means of this load cell 70.

According to this embodiment, as shown in FIG. 1, the guide rods 9 are mounted inside a circle that passes through the three tie bars 2, and the ball screws 37 are arranged outside the circle. In contrast with this, the guide rods 9 may be mounted outside the circle that passes through the three tie bars 2. In this case, the ball screws 37 are arranged inside the circle.

Referring now to FIGS. 18 to 29, a second embodiment of the present invention and modifications of some elements thereof will be described.

Figure 18:
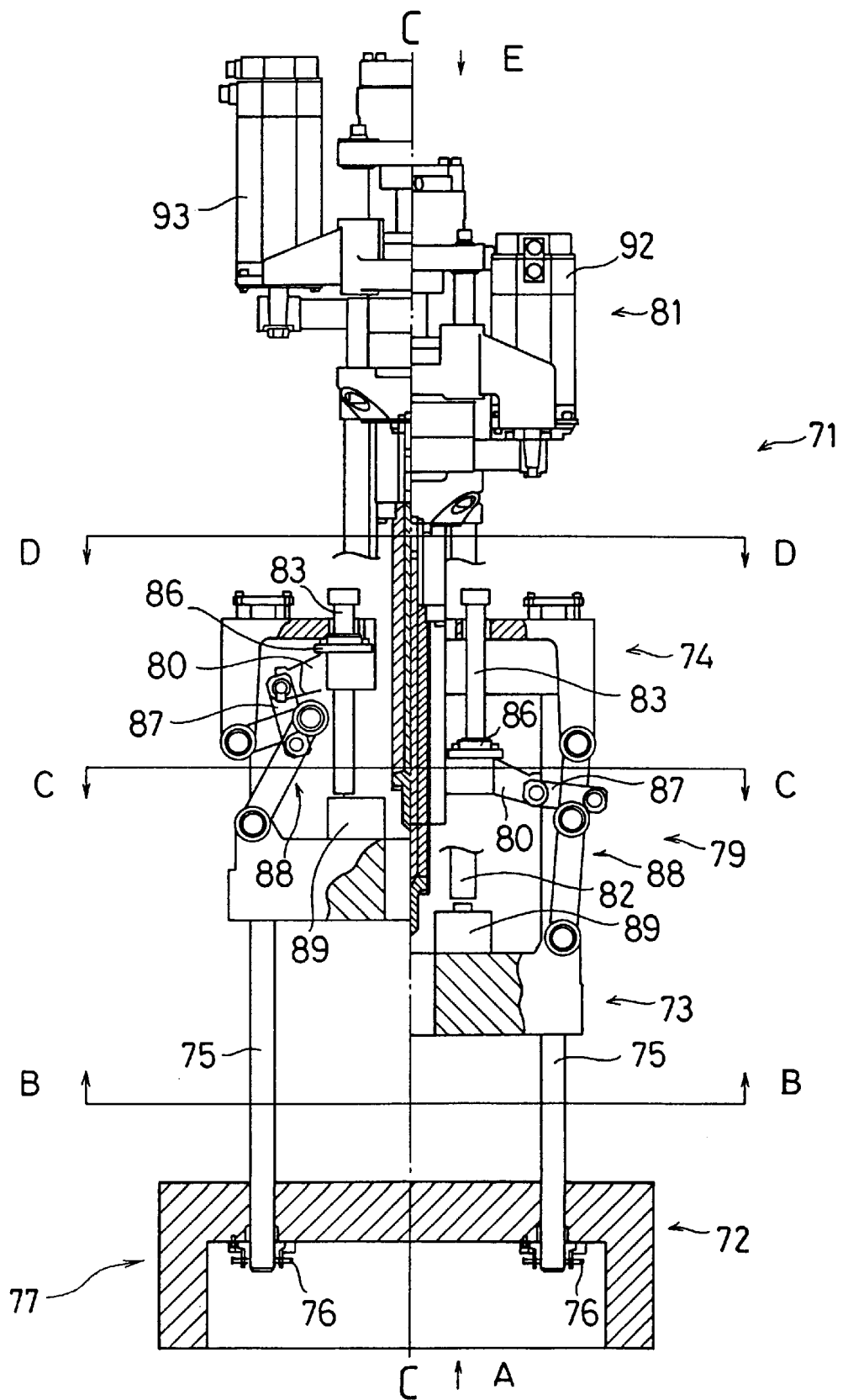
FIG. 18 is a sectional view showing principal parts of a vertical injection molding machine according to a second embodiment of the present invention.
Figure 19:
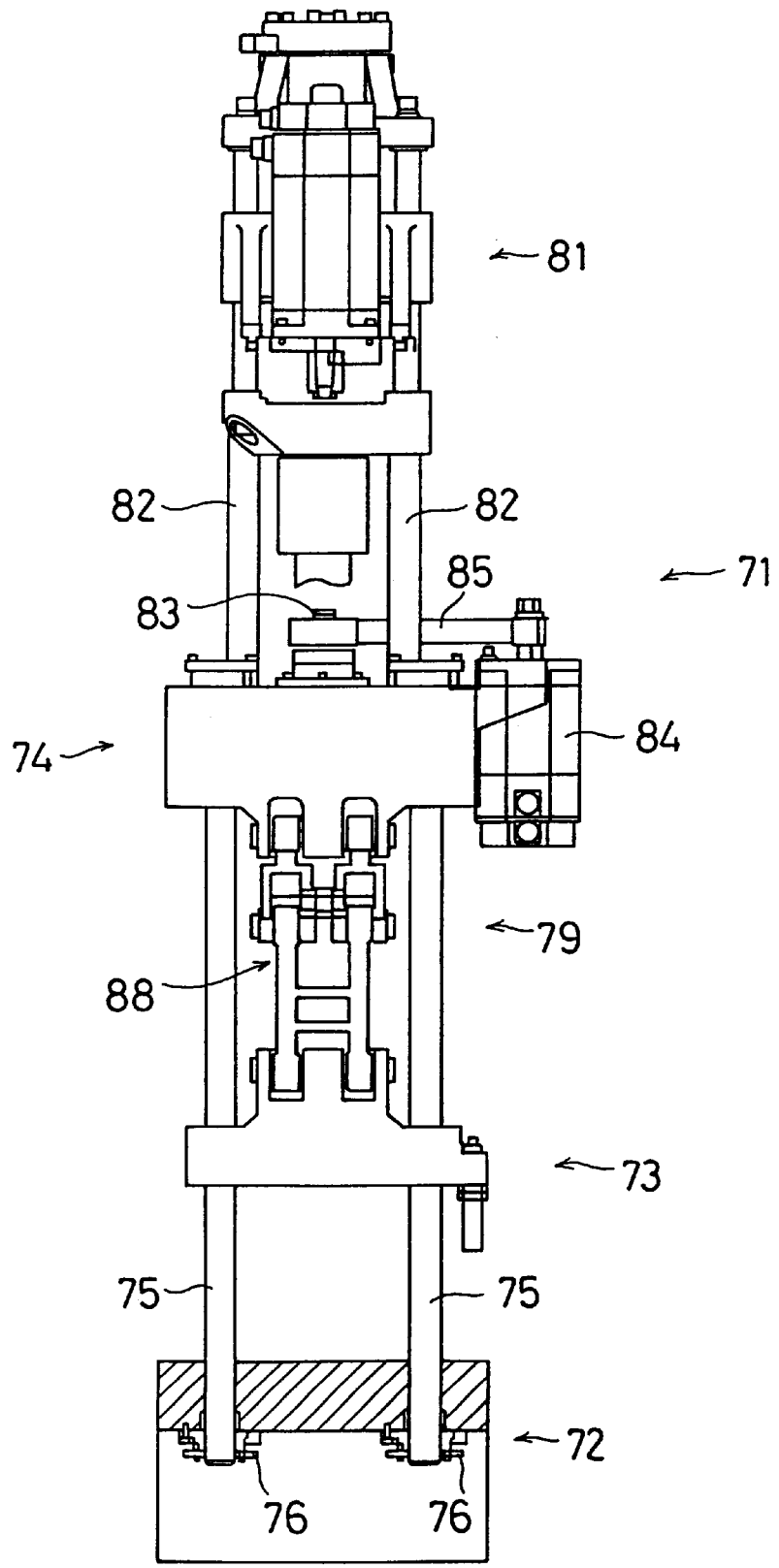
FIG. 19 is a sectional view of the principal parts of the vertical injection molding machine of FIG. 18 taken at another angle.

Referring first to FIGS. 18 and 19, an arrangement of principal parts of a vertical injection molding machine 71 according to the second embodiment will be described.

Since the principal parts of this vertical injection molding machine 71, including a stationary platen 72, rear platen 74, moving platen 73, injection unit 81, mold clamping mechanism section 79, mold thickness adjusting mechanism 77, etc., are arranged in the same manner as their corresponding elements according to the first embodiment described before, a detailed description of those parts is omitted. In FIG. 18, the portion on the left-hand side of the axis C—C represents a state in which the moving platen 73 is situated remote from the stationary platen 72, while the right-hand side portion represents a state in which the moving platen 73 is situated nearest to the stationary platen 72.

Figure 20:
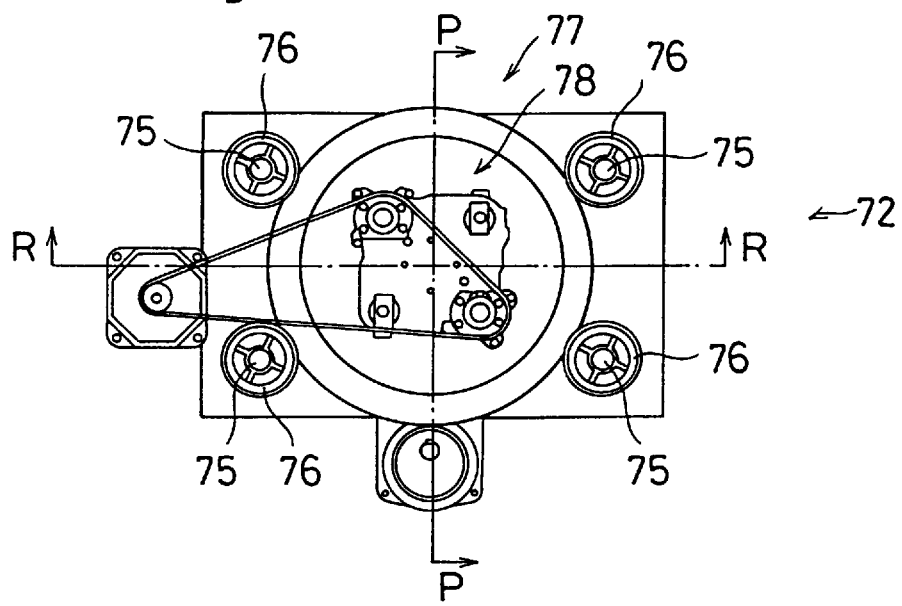
FIG. 20 is a plan view of a stationary platen of the injection molding machine of FIG. 18 taken in the direction of arrow A of FIG. 18.
Figure 21:
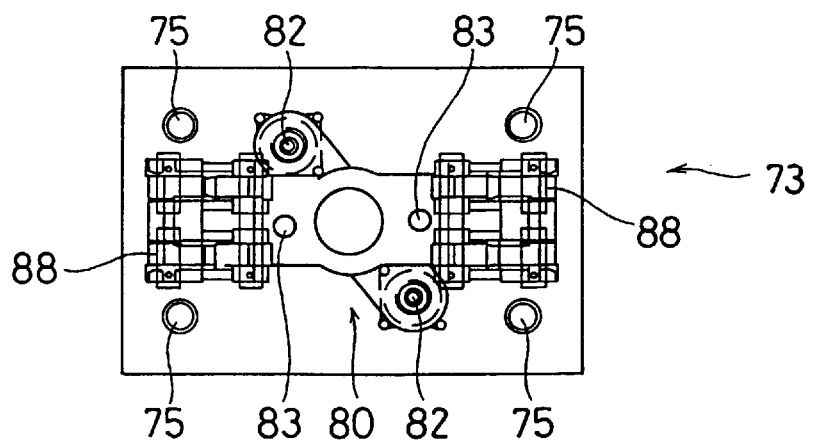
FIG. 21 is a plan view of a moving platen of the injection molding machine of FIG. 18 taken in the direction of arrow C—C of FIG. 18)
Figure 22:
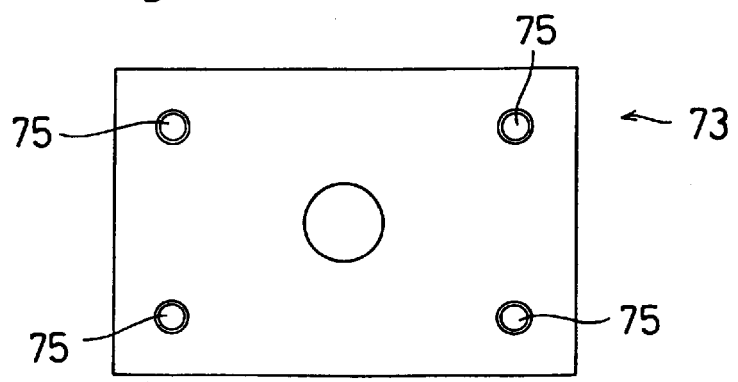
FIG. 22 is a plan view of the moving platen of FIG. 21 taken from the opposite side (in the direction of arrow B—B of FIG. 18)
Figure 23:
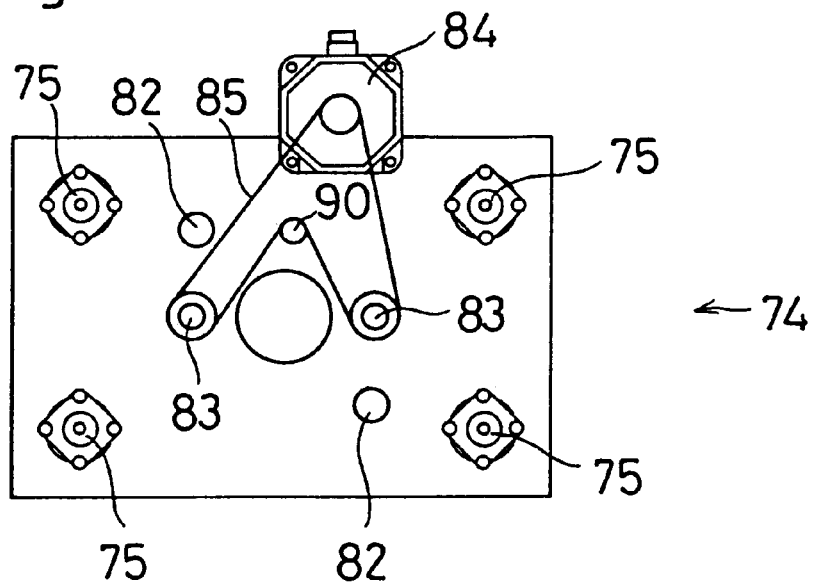
FIG. 23 is a plan view of a rear platen of the injection molding machine of FIG. 18 taken in the direction of arrow D—D of FIG. 18.

The tie bars 2 used in the first embodiment are three in number, but, in the present embodiment, four tie bars 75 are used. As shown in FIGS. 20, 21 and 23, therefore, the stationary platen 72, moving platen 73, and rear platen 74 have a rectangular external shape. FIG. 18 is a sectional view taken along line R—R of FIG. 20, and FIG. 19 is a sectional view taken along line P—P of FIG. 20. As shown in FIG. 20, moreover, the mold thickness adjusting mechanism 77 is constructed in the same manner as the mold thickness adjusting mechanism 14 according to the first embodiment except that it is provided with four tie bars 75 and four die height adjusting nuts 76. Also, the ejector mechanism 78 has the same construction as the ejector mechanism 22 according to the first embodiment does.

The elements of the vertical injection molding machine 71 according to this second embodiment which are structurally different from their counterparts according to the first embodiment are mounting structures for the mold clamping mechanism section 79 and guide rods 82 for guiding a crosshead 80 and an injection unit 81. The following is a description of these points.

[Mold Clamping Mechanism Section]

As shown in FIGS. 18 and 23, two ball screws 83 of the mold clamping mechanism section 79 are attached to the rear platen 74, in positions on either side of a center through hole to be penetrated by an injection cylinder, so as to be rotatable and immovable in the axial direction. These ball screws 83 are synchronously rotated by means of a timing belt 85 as a servomotor 84 (FIG. 23) for mold clamping, fixed to one side of the rear plate 74, is driven. A small pulley 90 is means for regulating the path of travel of the timing belt 85.

As shown in FIG. 18, ball nuts 86 to mate with the ball screws 83 are fixed to the crosshead 80. When the two ball screw 83 rotate synchronously, therefore, the crosshead 80 moves toward the rear platen 74 or away from the rear platen 74. As the crosshead 80 moves in this manner, the moving platen 73 is moved by means of crosshead links 87 and toggle links 88, whereupon mold clamping and mold opening operations are carried out.

[Guide Rod]

The two guide rods 82 are set up on the upper surface (surface opposed to the rear platen 74) of the moving platen 73 through air cylinders 89. As shown in FIGS. 21 and 23, these guide rods 82 penetrate through holes formed in the crosshead 80 and the rear platen 74 so as to project above the rear platen 74. As shown in FIG. 19, the injection unit 81 is fixed to the respective upper ends of the guide rods 82.

Mounting positions for the two guide rods 82 on the moving platen 73 are selected lest the two guide rods 82 passing through the through holes in the rear platen 74 interfere with the ball screw 83 that are attached to the rear platen 74. Thus, the two guide rods 82 are arranged substantially on a diagonal line of the rectangular shape of the moving platen 73. As shown in FIG. 23, therefore, the positions in which the two guide rods 82 penetrate the rear platen 74 are also situated on a diagonal line of the rectangular shape of the rear platen 74.

As in the first embodiment, the guide rods 82 guide the crosshead 80 in sliding motion, the guide rods 82 support the injection unit 81, and sprue-break and nozzle-touch operations are carried out as the air cylinders 89 project or recede.

Figure 24:
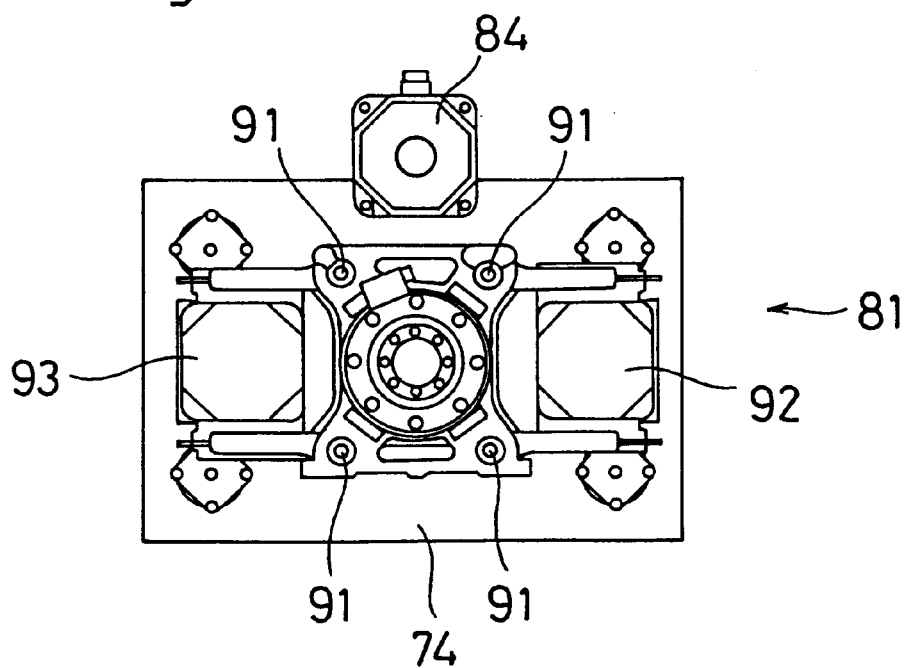
FIG. 24 is a plan view of an injection unit of the injection molding machine of FIG. 18.

The injection unit 81 differs from the one according to the first embodiment in that its front plate, pusher plate, and rear plate have a rectangular shape and are connected by means of four tie rods 91. However, drive mechanisms for the individual parts are substantially equivalent to those of the injection unit 8 according to the first embodiment described with reference to FIG. 14. In FIGS. 18 and 24, reference numerals 92 and 93 denote a metering motor and an injection servomotor, respectively.

Referring now to FIGS. 25 to 29, modifications of the second embodiment will be described.

[First Modification]

Figure 25:
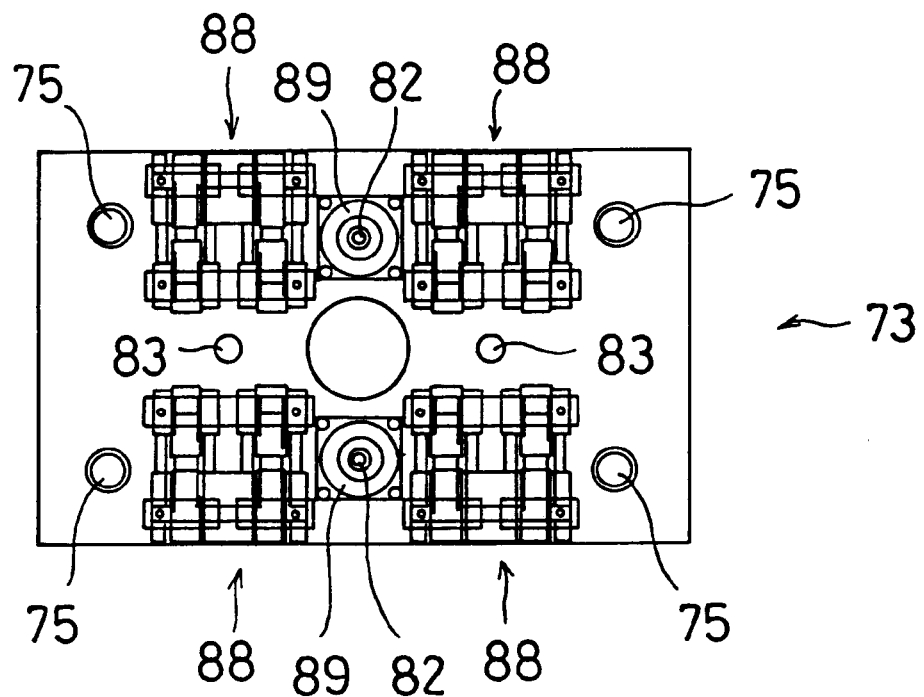
FIG. 25 is a plan view of a moving platen in another form used in place of the moving platen of FIG. 21.

As shown in FIG. 25, four sets of toggle links 88 are arranged on the upper surface (the surface opposed to a rear platen 74) of a moving platen 73. A set of double-toggle link is formed from those two sets of toggle links 88, among these toggle links 88, which are opposed in the direction of the short sides of the rectangular shape of the moving platen 73. Thus, two sets of double-toggle links are formed from the four sets of toggle links 88. In order to maintain the balance between each pair of sets of toggle links 88, a ball screw 83 for feeding a crosshead 94 is arranged halfway between those two sets of toggle links 88. Mounting positions for two guide rods 82 on the moving platen 73 are located halfway between those two sets of toggle links 88 which are opposed in the direction of the long sides of the rectangular shape of the moving platen 73.

Figure 26:
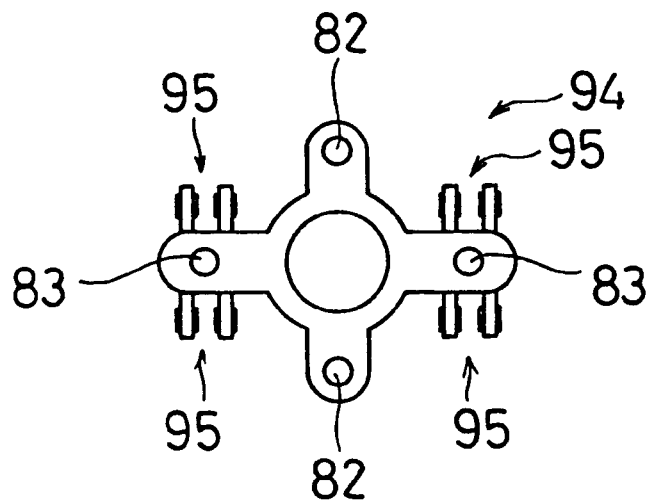
FIG. 26 is a plan view of a crosshead used together with the moving platen of FIG. 25.

As shown in FIG. 26, the crosshead 94 has a form such that two long arms and two short arms protrude from its central portion that has a through hole for the passage of an injection cylinder in the center. A ball nut to mate with each ball screw 83 is embedded in the extreme end portion of each long arm, and staples 95 are provided individually on the left- and right-hand outer peripheries of the extreme end portion. Pivotally mounted on the staples 95 are crosshead links connected to the paired toggle links 88. Formed individually in the respective extreme end portions of the short arms, moreover, are through holes through which the guide rods 82, set up individually on the air cylinders 89 on the upper surface of the moving platen 73, are passed, and the crosshead 94 is guided by the guide rods 82.

[Second Modification]

In the first modification described above, as shown in FIG. 25, the mounting positions for the guide rods 82 on the moving platen 73 are located halfway between those two sets of toggle links 88 which are opposed in the direction of the long sides of the rectangular shape of the moving platen 73, so that a line that connects the two guide rods 82 extends at right angles to a line that connects the two ball screws 83.

Figure 27:
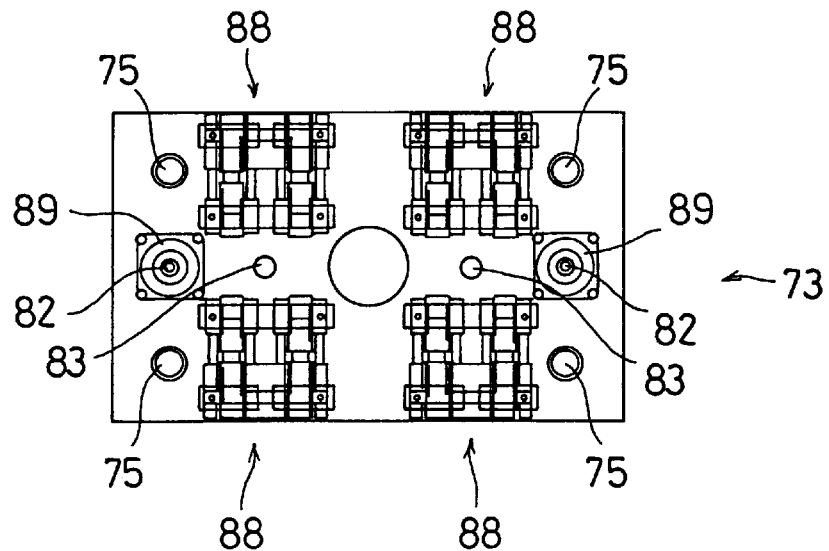
FIG. 27 is a plan view of a moving platen in still another form used in place of the moving platen of FIG. 21.

Alternatively, the two guide rods 82 may be mounted on the moving platen 73 so that the line that connects them is situated on extensions of the line that connects the two ball screws 83, as shown in FIG. 27.

Figure 28:
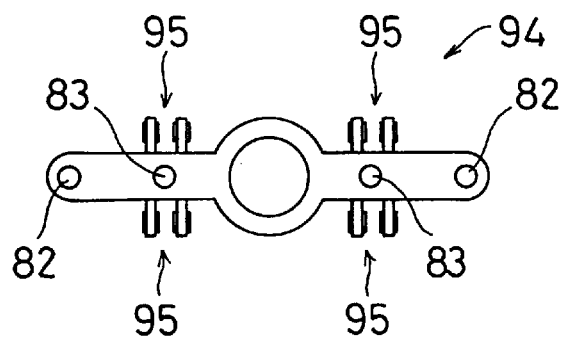
FIG. 28 is a plan view of a crosshead used together with the moving platen of FIG. 27.
Figure 29:
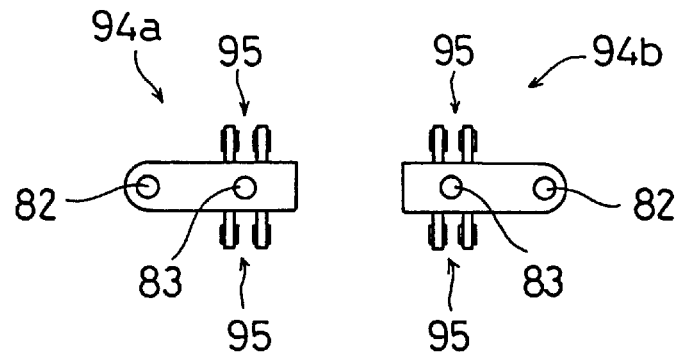
FIG. 29 is a plan view of a crosshead in another form used in place of the crosshead of FIG. 27.
Figure 30A:
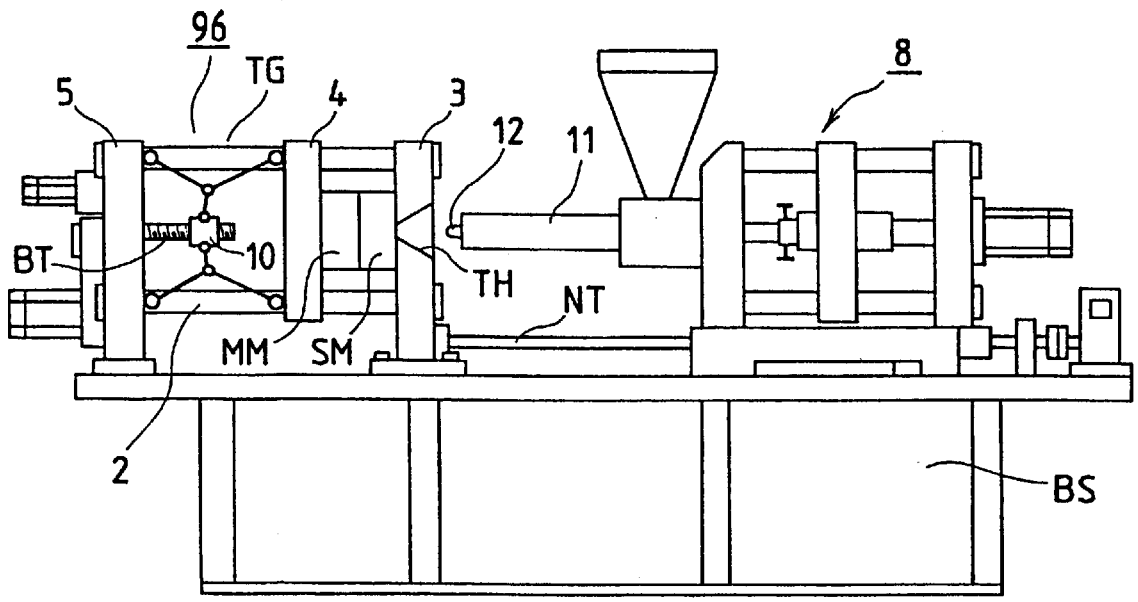
FIG. 30A is a view for illustrating a general construction of an example of a conventional horizontal injection molding machine.
Figure 30B:
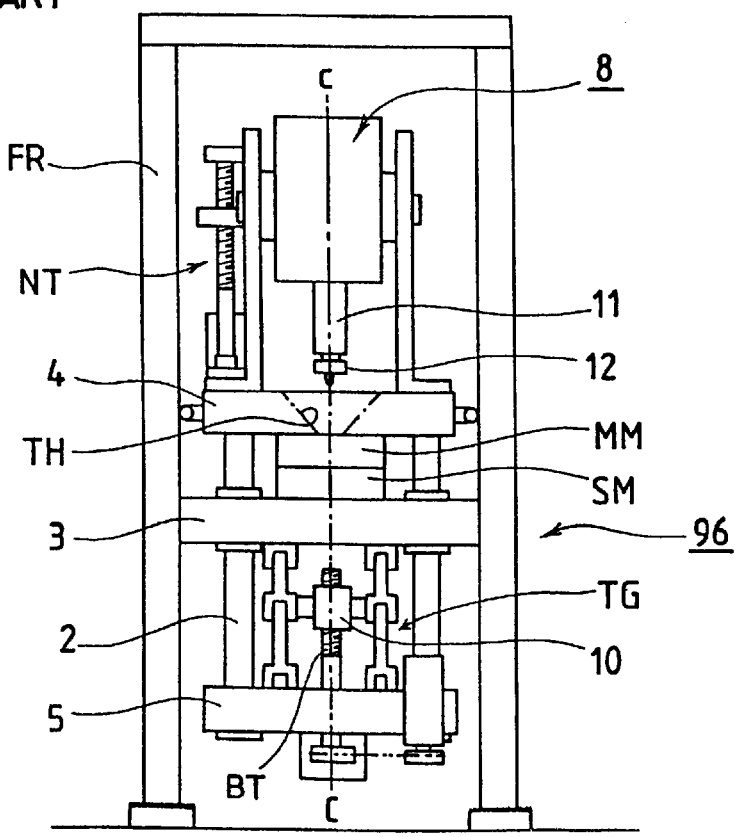
FIG. 30B is a view for illustrating a general construction of an example of a conventional vertical injection molding machine.

According to this arrangement, the crosshead 94 used in this modification has a form such that two long arms protrude from its central portion that has a through hole for the passage of an injection cylinder in the center, as shown in FIG. 28. A ball nut to mate with each ball screw 83 is embedded in the proximal end portion of each arm, and a through hole for the passage of each guide rod 82 is formed on the distal end portion.

[Third Modification]

In the second modification described above, no interactive forces act between one pair of toggle links 88 and the other pair of toggle links 88. Accordingly, the crosshead 94 may be divided into two crossheads 94*a* and 94*b*, as shown in 29, instead of being formed integrally in the manner shown in FIG. 28. In this case, the ring-shaped central portion that connects the two arm portions and allows the passage of the injection cylinder can be omitted, so that replacement of the injection cylinder can be facilitated.

Although the first and second embodiments of the vertical injection molding machine described above, are vertical injection molding machines, these knowledge can be also applied to a horizontal injection molding machine. In this case, the same results such as reduction in the number of components used and reduction in manufacturing cost as in the case of the vertical injection molding machine can be obtained.

We claim:

1. An injection molding machine having a frame, comprising:

a stationary platen fixed to the machine frame of the injection molding machine;

a plurality of tie bars having respective second ends being fixed to said stationary platen;

a rear platen fixed to respective first ends of each of said plurality of tie bars;

a moving platen arranged between said stationary platen and said rear platen with said plurality of tie bars passing through through holes formed in said moving platen allowing said plurality of tie bars to pass therethrough;

an injection unit arranged on a side of said rear platen not opposed to said moving platen;

a plurality of guide rods having respective first ends fixed to said injection unit;

a moving mold and a stationary mold which are mounted opposite to each other on said moving platen and said stationary platen, respectively, wherein respective second ends of said guide rods are fixed to a surface of said moving platen on which said moving mold is not mounted;

a toggle mold clamping mechanism arranged between said rear platen and said moving platen and provided with a crosshead having through holes allowing said guide rods to pass therethrough, said guide rode respectively passing through the through holes of the crosshead; and an injection cylinder passing through a through hole formed in a center of said rear platen, a gap formed in a center of said toggle mold clamping mechanism and a through hole formed in a center of said moving platen, wherein the crosshead of said toggle mold clamping mechanism moves in a straight line, guided by said guide rods, in response to driving the crosshead so that said moving platen and said injection unit coupled to said moving platen by means of said guide rods, move toward or away from said stationary platen.

2. An injection molding machine according to claim 1, wherein the first end of each said guide rods is respectively fixed to the surface of said moving platen not opposed to the moving mold through a rectilinear motion mechanism moving said guide rods in an axial direction thereof.

3. An injection molding machine according to claim 1, wherein said toggle mold clamping mechanism includes a plurality of toggle links connected to the crosshead actuated by a plurality of ball screw-nut mechanisms.

4. An injection molding machine according to claim 1, wherein said tie bars and said guide rods are three in number, respectively.

5. An injection molding machine according to claim 4, wherein the crosshead includes a sheet of a plate formed such that three arm portions protrude radially from a central portion thereof at intervals of 120°, the central portion of the crosshead formed with a through hole allowing said injection cylinder to pass therethrough and each of the arm portions is formed with a first through hole allowing a respective guide rod to pass therethrough and a second through hole penetrated by a respective tie bar and is provided with a respective ball nut to engage with a respective ball screw thereby actuating the crosshead.

6. An injection molding machine according to claim 1, wherein said tie bars are four in number, and said guide rods are two in number.

7. An injection molding machine according to claim 6, wherein the crosshead includes a sheet of a plate formed such that a first pair of arm portions protrude from a central portion thereof at intervals of 180° and a second pair of arm portions further protrude from the central portion at intervals of 180° and at a space of about 90° from the first pair of arm portions, the central portion formed with a through hole allowing the injection cylinder to pass therethrough, each of the first pair of arm portions is provided with a respective ball nut to engage with a respective ball screw actuating the crosshead, and each of the second pair of arm portions is formed with a through hole allowing a respective guide rod to pass therethrough.

8. An injection molding machine according to claim 1, wherein the first end of each said tie bars extends through the stationary platen to project for a certain length from a surface thereof which is opposite from a surface on which the stationary mold is mounted, and the projection length is adjustable in accordance with a distance between said stationary platen and said ear platen.

9. An injection molding machine according to claim 1, wherein a surface of said stationary platen opposite from a surface on which the stationary mold is mounted carries thereon an ejector mechanism urging an ejector rod, passing through a through hole formed in said stationary platen, to move straight.

10. An injection molding machine having a stationary platen, a rear platen and a moving platen arranged between the stationary platen and the rear platen, comprising:

an injection unit arranged on a side of the rear platen not opposed to the moving platen;

a plurality of guide rods having respective first ends fixed to said injection unit;

a moving mold and a stationary mold which are mounted opposite to each other on the moving platen and the stationary platen, respectively, wherein respective second ends of said guide rods are fixed to a surface of the moving platen on which said moving mold is not mounted;

a toggle mold clamping mechanism arranged between the rear platen and the moving platen and provided with a crosshead having through holes allowing said guide rods to pass therethrough, said guide rods respectively passing through the through holes of the crosshead; and an injection cylinder passing through a through hole formed in a center of the rear platen, a gap formed in a center of said toggle mold clamping mechanism and a through hole formed in a center of the moving platen, wherein the crosshead of said toggle mold clamping mechanism moves in a straight line, guided by said guide rods, in response to driving the crosshead so that the moving platen and said injection unit coupled to the moving platen by means of said guide rods, move toward or away from the stationary platen.

* * * * *

UNITED STATES PATENT AND TRADEMARK OFFICE
CERTIFICATE OF CORRECTION

PATENT NO.:     6,024,560
DATED     :     February 15, 2000
INVENTOR(S):    Susumu ITO, et al.

It is certified that errors appears in the above-identified patent and that said Letters Patent is hereby corrected as shown below:

Title page, item
[22] PCT Filed:

Change "1996" to --1997--. (Pursuant to the Declaration/POA filed).

Column 3, line 4, "This" should not begin a new paragraph.

Column 13, line 58, change "rode" to --rods--.

Column 14, line 48, change "ear" to --rear--.

Signed and Sealed this

Twenty-sixth Day of December, 2000

Attest:

Q. TODD DICKINSON

Attesting Officer          Director of Patents and Trademarks